United States Patent Office 3,597,418
Patented Aug. 3, 1971

3,597,418
SPIRO[3α,5α - CYCLO - 5α - ANDROSTANE-7,1'-CYCLOPROPANES], THEIR 3β-HYDROXY-Δ⁵ AND 3-KETO-Δ⁴-COUNTERPARTS, AND THE 19-NOR ANALOGUES OF THE FOREGOING
J. Allan Campbell and John C. Babcock, Kalamazoo, Mich., assignors to The Upjohn Company, Kalamazoo, Mich.
No Drawing. Filed July 29, 1969, Ser. No. 845,891
Int. Cl. C07c $173/10$
U.S. Cl. 260—239.5            13 Claims

ABSTRACT OF THE DISCLOSURE

This invention relates to novel spiro[3α,5α-cyclo-5α-androstane-7,1'-cyclopropanes], their 3β-hydroxy-Δ⁵, and 3-keto-Δ⁴-counterparts, and the 19-nor analogues of the foregoing, embraced by the formulae:

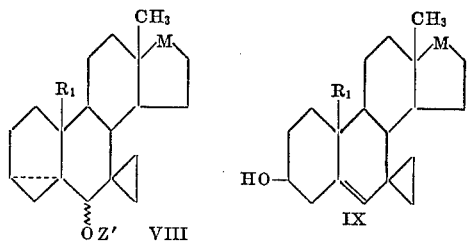

and

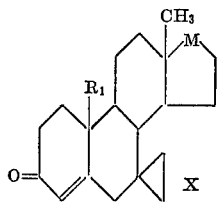

wherein ∫ is a generic expression denoting α- and β-bonds and mixtures thereof; $R_1$ is selected from the group consisting of hydrogen and methyl; Z' is selected from the group consisting of hydrogen, alkyl of from one through twelve carbon atoms, and the acyl radical of a hydrocarbon carboxylic acid containing from one through twelve carbon atoms; M is selected from the group consisting of

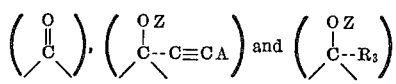

wherein A is selected from the group consisting of hydrogen, alkyl of from one through four carbon atoms, chlorine, bromine and trifluoromethyl, $R_3$ is selected from the group consisting of hydrogen, alkyl of from one through twelve carbon atoms and alkenyl of from two through twelve carbon atoms, and Z is selected from the group consisting of hydrogen and the acyl radical of a hydrocarbon carboxylic acid containing from one through twelve carbon atoms. The compounds of Formula VIII have anabolic, androgenic, anti-fertility, cholesterol mobilizing, erthropoietic, estrogenic and antihormonal activities. The compounds of Formulae IX and X have cholesterol and triglyceride suppressing, estrogenic, antiestrogenic and erythropoietic properties. The aforesaid compounds (VIII, IX and X) are consequently useful in treating mammals, including humans, and birds in those conditions where the foregoing properties make the new compounds valuable in medical and veterinary practice.

BRIEF SUMMARY OF THE INVENTION

The novel compounds of this invention, intermediates therefor and process for their production are illustratively represented by the following sequence of formulae:

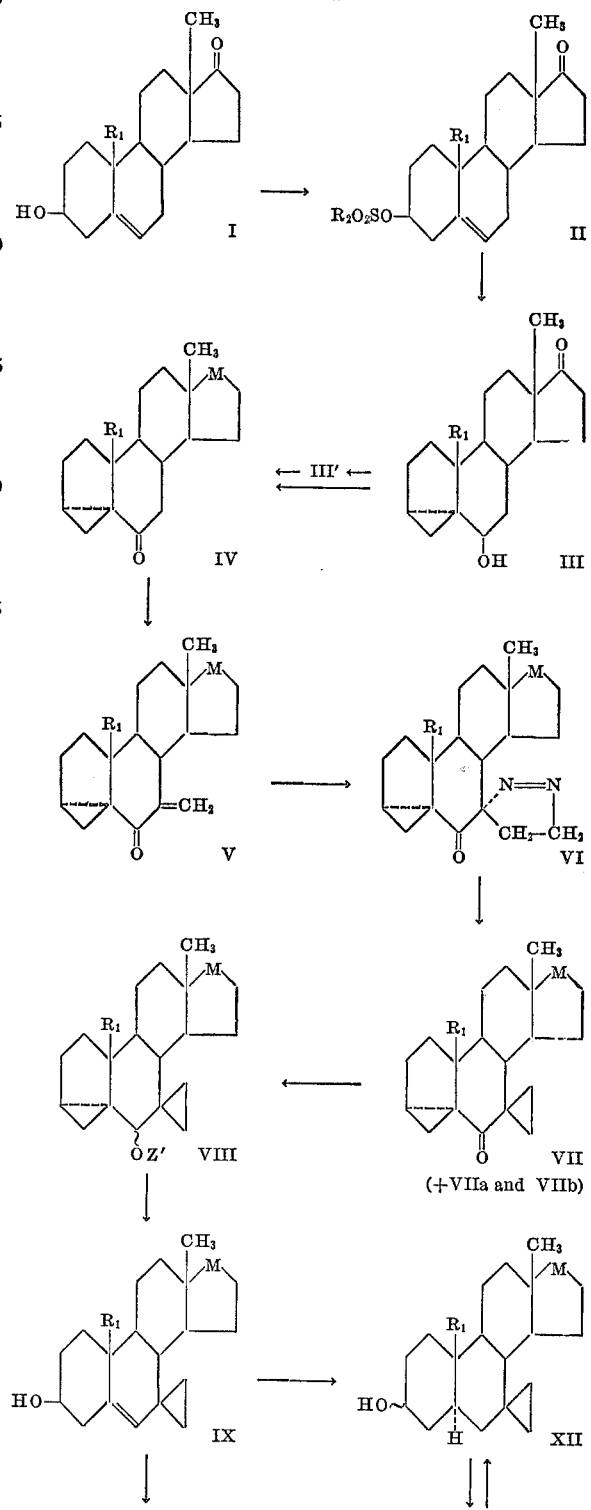

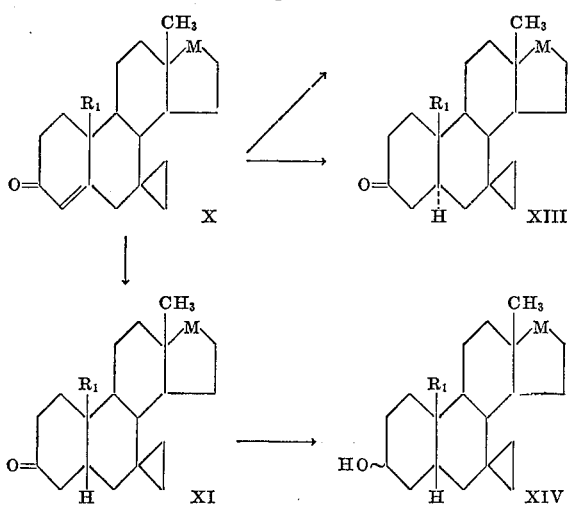

wherein ʃ, $R_1$, $Z'$ and M have the same meaning as above; $R_2$ is an organic radical selected from the group consisting of alkyl of from one through twelve carbon atoms and aryl of from six through twelve carbon atoms; the symbol

attached to the 7-position of the steriod nucleus represents a 7,1'-spirocyclopropyl radical of the formula

which substituent will henceforth be designated "7-spirocyclopropyl."

In this application the term "acyl" means the acyl radical of an organic carboxylic acid, preferably a hydrocarbon carboxylic acid of from one through twelve carbon atoms, for example, saturated and unsaturated aliphatic acids and aromatic acids, such as acetic, propionic, butyric, valeric, caproic, caprylic, octanoic, decanoic, dodecanoic, tripropylacetic, crotonic, cyclopentylacetic, cyclopentylpropionic, cyclohexylacetic, benzoic, toluic, ethylbenzoic, phenylbutyric, phenylvaleric, cinnamic, naphthaleneacetic, p-butoxyphenylpropionic, phenylpropiolic, glutaric, maleic acids, and the like. The term "alkyl" means an alkyl radical, preferably of from one through twelve carbon atoms, such as methyl, ethyl, propyl, butyl, amyl, hexyl, heptyl, octyl, nonyl, decyl, undecyl, dodecyl and isomeric forms thereof. The term "alkenyl" means an alkenyl radical, preferably of from two through twelve carbon atoms, for example, ethnyl, propenyl, butenyl, pentenyl, hexenyl, heptenyl, octenyl, nonenyl, decenyl, undecenyl, dodecenyl and isomeric forms thereof. The term "alkynyl" means an alkynyl radical, preferably of from two through five carbon atoms, for example, ethynyl, propynyl, butynyl, pentynyl and isomeric forms thereof. The term "haloalkynyl" means a haloalkynyl radical, preferably of from two through five carbon atoms; it differs from an alkynyl radical by having one or more of its hydrogen atoms substituted by halogen; typical haloalkynyl radicals are chlorethynyl, bromoethynyl, trifluoromethylethynyl, and the like. The term "aryl" means an aryl radical of from six through twelve carbon atoms, such as phenyl, tolyl, xylyl, naphthyl, alkylnaphthyl, diphenyl, and the like.

The novel compounds embraced by Formulae VI through XIV of the flow-sheet, above, are prepared by the route shown therein, employing the methods and reactions described below.

The novel compounds of Formula VI through XIV are prepared from the known starting materials of Formula I of the flow-sheet. The compounds of Formula I are known in the art and may also be synthesized in the manner described in U.S. Patent 3,380,886, wherein the procedures for obtaining the corresponding 7-methyl compounds are set forth.

(1) The first step of the novel process involves the 3-sulfonylation of the compounds of Formula I, e.g., by mixing them with an excess of an organic sulfonyl halide (in pyridine) to yield the 3-aryl or 3-alkyl sulfonate of a 3β-hydroxy-5-androstene-17-one (II).

(2) The next step of the process comprises subjecting the compounds of Formula II to the i-steroid rearrangement (see: Fieser and Fieser, Steroids, pages 314 through 316, Reinhold Publishing Corp., New York, N.Y., 1959) to give the compounds of Formula III. By this procedure a 3-aryl or alkyl sulfonate of the compounds of Formula II, on heating at reflux in an inert solvent such as acetone or benzene containing water, with an alkali metal acylate, e.g., potassium acetate, sodium benzoate, potassium phenylacetate, etc., yields the corresponding 6β-hydroxy-3α,5α-cycloandrostane-17-ones of Formula III.

(3) A 17-keto compound of Formula III is converted to a corresponding 6β,17β-dihydroxy compound (III') by the known methods described in (a), (b), (c), (d), (e) and (f), below.

(a) By reducing the 6β-ol-17-one compounds of Formula III exclusively at the 17-position, e.g., by reaction with sodium borohydride, lithium tri-t-butoxy aluminium hydride, lithium aluminum hydride and the like, to give the corresponding 17αH-3α,5α-cycloandrostane-6β,17β-diols (III').

(b) By mixing the 17-ketones (III) with an alkyl lithium (e.g., methyl lithium, ethyl lithium, propyl lithium, butyl lithium, etc.) to yield the corresponding 17-alkyl-3α,5α-cycloandrostane-6β,17β-diols (III'). The reaction is advantageously conducted in excess of the stoichiometric proportion, preferably in an amount of at least 1.5 moles of alkyl lithium per mole of starting 17-ketone (III).

(c) By mixing the 17-ketones of Formula III with an appropriate Grignard reagent, i.e., an alkyl magnesium halide or an alkenyl magnesium halide such as methylmagnesium bromide, ethylmagnesium chloride, propylmagnesium iodide, hexylmagnesium bromide, alkylmagnesium chloride, 3-pentenylmagnesium bromide, 4-nonenylmagnesium iodide, etc., in the presence of a solvent such as ether, tetrahydrofuran, benzene and the like, to produce the corresponding 17α-alkyl (or 17α-alkenyl)-3α,5α-cycloandrostane-6β,17β-diols (III'). Preferably the Grignard reagent is employed in an excess of the order of 3 to 10 moles per mole of starting 17-ketone (III).

(d) By mixing the 17-ketones (III) with an alkali metal derivative such as lithium acetylide, sodium acetylide, potassium acetylide, sodium or potassium methylacetylide, sodium or potassium ethylacetylide, sodium or potassium propylacetylide, sodium butylacetylide, etc., in the presence of an inert solvent such as dioxane, dimethylformamide or dimethylsulfoxide, to yield the corresponding 17α - alkynyl - 3α,5α - cycloandrostane - 6β,17β - diols (III').

(e) By treating the 17-ketone (III) with an alkynylmagnesium halide (prepared by slowly passing a gas such as acetylene, methylacetylene, propylaceaylene, butylacetylene, etc., through an ether solution of an alkylmagnesium halide, such as methylmagnesium bromide) in a solvent, such as tetrahydrofuran, ether, benzene, etc., to yield the corresponding 17α-alkynyl-3α,5α-cycloandrostane-6β,17β-diols (III').

(f) The 17α - alkynyl - 3α,5α - cycloandrostane - 6β, 17β-diols (III'), prepared as in (d) and (e), above, are hydrogenated, e.g., in the presence of a suitable hydrogenation catalyst (such as palladium on charcoal) to obtain the corresponding 17α-alkynyl (or alkyl)-3α,5α-cycloandrostan-6β,17β-diols (III'). When the 17α-alkynyl compounds (III') are reduced with 1 molar equivalent of hydrogen, the corresponding 17α-alkenyl products (III') are obtained; using 2 molar equivalents yields the 17α-alkyl counterparts (III').

(4) The 6β-hydroxy-17-keto compounds of Formula III and the 6β,17β-diols of Formula III' are oxidized exclusively at the 6-position to yield the corresponding 6,17 diketones (IV) and 6-keto-17β-ols (IV), respectively, by the known procedures set forth in (a), (b), and (c), below.

(a) By mixing the 3α,5α-cycloandrostane-6β-ol-17-ones (III) with chromium trioxide-pyridine complex at moderate (room) temperature, in accordance with the procedure described in Tetrahedron 24, 4037, to yield the corresponding 3α,5α-cycloandrostane-6,17-diones (IV). Alternatively, instead of using the chromium trioxide-pyridine complex as the oxidant, Jones reagent (8 N chromium trioxide in concentrated sulfuric acid diluted with water) on mixing with the 6β-ol-17-ones (III) dissolved in acetone, also yields the corresponding 6,17-diones (IV).

(b) By mixing the 17αH-3α,5α-cycloandrostane-6β,17β-diols (III') with manganese dioxide (in accordance with the procedure of Example 1 of U.S. Patent 2,842,542) to give the corresponding 17αH-17β-hydroxy-3α,5α-cycloandrostan-6-ones. (IV). Another (and preferable) procedure is available, namely, first mixing the 17αH-3α,5α-cycloandrostane-6β,17β-diols (III') (in pyridine) with an acid anhydride of a hydrocarbon carboxylic acid to give the corresponding 6β,17β-diacylates (III'), and then producing the corresponding 17αH-17β-hydroxy-3α,5α-cycloandrostane-6-one 17-acylates (IV) by following the alternative oxidation procedure described at the end of (a), above.

(c) By following the oxidation procedure of (a), above, the 17α - alkyl-3α,5α-cycloandrostane - 6β,17β-diols (III') the 17α-alkynyl-3α,5α-cycloandrostane-6β,17β-diols (III') and the 17α-alkenyl-3α,5α-cycloandrostane-6β,17β-diols (III') yield, respectively, the corresponding 17α-alkyl-17β-hydroxy-3α,5α-cycloandrostan-6-one (IV), the 17α-alkynyl-17β-hydroxy-3α,5α-cycloandrostane-6-one (IV) and the 17α-alkenyl-17β-hydroxy-3α,5α-cycloandrostane-6-one (IV). The thus produced 17β-ols (IV) are converted to their corresponding 17-acylates by known procedures, e.g., by mixing (in pyridine) with an anhydride or halide of an organic carboxylic acid at moderate (room temperature (17αH) and by heating in an anhydride or an anhydridepyridine mixture at elevated temperatures (17α-alkyl, alkenyl and alkynyl).

(5) In this step of the process, the 6-keto-compounds of Formula IV are converted to their 7-methylene counterparts (V) by heating, preferably at reflux, with paraformaldehyde in the presence of an acid salt (e.g., a dialkylammonium halide) in a solvent such as dioxane.

(6) In this step, the 7-methylene compounds of Formula V on mixing with diazomethane at low (room) temperature yield the corresponding spiro[7,3' [1] pyrazolines] (VI).

(7) Heating the spiro[7,3' [1]pyrazolines] of Formula VI produced in the previous step (e.g., under vacuum and at about 150° C.) gives, respectively, the corresponding 7-spirocyclopropyl-3α,5α-cycloandrostan-6-ones (VII), the 7-ethylidene-3α,5α-cycloandrostan-6-ones (VIIa) and the 7(2'-hydroxyethyl)-3α,5α-cycloandrostan-6-ones (VIIb). The compounds of Formula VII wherein M is

are converted to the corresponding 17β-ol-6-ones (VII) by reduction at the 17-position, e.g., by mixing with lithium aluminum tri-t-butoxyhydride, sodium borohydride and like reducing agents. Compounds of Formula VIIb are useful as chemical intermediates since they can be converted to the corresponding 2'-tosylate and, on treatment with base, provide additional amounts of the 7-cyclopropyl steroid (VII).

(8) In this step of the process, the 7-spirocyclopropyl-3α,5α-cycloandrostan-6-ones (VII) are reduced (e.g., with sodium borohydride) at the 6-position to give the corresponding 6α-ols (VIII). When X is

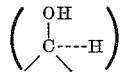

it will be reduced so that M will become

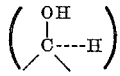

The acylation of the compounds of Formula VIII wherein Z' is hydrogen is carried out in the usual manner, i.e., by mixing with an acid anhydride or acid halide of an organic carboxylic acid in pyridine at room temperature for several days. When M is

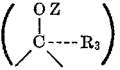

the 17β-hydroxyl group is also acylated and the 6,17-diacylates (VIII) are produced.

The 17-monoacylates of Formula VIII wherein M is

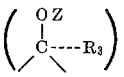

wherein Z is lower acyl and R₃ is hydrogen are produced by sodium borohydride reduction of the corresponding compound of Formula VII wherein M, Z and R₃ are defined as above. The 6-monoacylates of Formula VIII wherein M is

and Z and R₃ are hydrogen are ordinarily prepared from the 6,17-diacylates of Formula VIII wherein Z' and Z are acyl, by selective hydrolysis of the 17-acyl function Z, preferably using an alkali metal bicarbonate in water and an alkanol such as methanol at room temperature for several hours. Said selective hydrolysis is most conveniently performed on compounds of Formula VIII wherein Z' is the acyl radical of a hydrocarbon carboxylic acid of from two through twelve carbon atoms and Z is formyl or trifluoroacetyl, although when desired Z' and Z can be the same.

The 6-keto compounds of Formula VII wherein M is

are converted to their 6α-ol counterparts (VIII), i.e., the 7-spirocyclopropyl-6α-hydroxy - 3α,5α - cycloandrostan-17-ones (VIII) by the known procedures of J. Amer. Chem. Soc. 76 5024, employed in the manner recited in (a), (b) and (c), below.

(a) By heating the 7-spirocyclopropyl-3α,5α-cycloandrostane-6,17-diones (VII) in 2-methyl-2-ethyl-1,3-dioxolane in the presence of a ketalization catalyst such as p-toluenesulfonic acid, to yield the corresponding 7-spirocyclopropyl - 3α,5α - cycloandrostane-6,17-dione 17-ketals.

(b) By mixing the thus produced 7-spirocyclopropyl-3α,5α-cycloandrostane-6,17-dione 17-ketals with a reducing agent such as sodium borohydride at low temperature, to yield the corresponding 7-spirocyclopropyl-6α-hydroxy-3α,5α-cycloandrostan-17-one 17-ketals.

(c) By mixing the 17-ketal compounds produced in (b), above, in a solvent such as acetone in the presence of a catalyst such as p-toluenesulfonic acid at moderate (room) temperature to give the corresponding 7-spirocyclopropyl-6α-hydroxy-3α,5α-cycloandrostan - 17 - ones (VIII). The 6-acylation of the thus produced compounds of Formula VIII wherein Z' is hydrogen is carried out in the usual manner, namely, by mixing with an acid anhydride or acid halide of an organic carboxylic acid in pyridine at room temperature for several days.

The 6α-ol-17-keto compounds of Formula VIII are converted to their 6α,17β-diol-17α-hydrogen (and 17α-alkyl, 17α-alkynyl and 17α-alkenyl) counterparts (VIII) in accordance with the procedures of section (3), above.

(9) In the next step of the process, the compounds of Formula VIII are readily rearranged, for example, by mixing with a strong acid, e.g., hydrochloric acid, at low temperature, to give the corresponding 7-spirocyclopropyl-5-androsten-3β-ols (IX).

The thus produced compounds of Formula IX are mixed with an organic sulfonyl halide in a base such as pyridine to yield the corresponding 7-spirocyclopropyl-5-androsten-3β-ol 3-aryl (or alkyl) sulfonates. Excess sulfonyl halide is employed except when M is

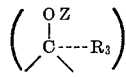

wherein $R_3$ and Z are hydrogen; in this instance, 1 to 1.2 equivalents of sulfonyl halide is used for each equivalent of the compounds of Formula IX.

Subjecting the thus produced 5-androsten-3β-ol 3-aryl (or alkyl) sulfonates to the i-steroid rearrangement, in the manner described in (2), above, yields the corresponding 7 - spirocyclopropyl - 3α,5α - cycloandrostan-6β-ols (VIII). When this procedure is modified by omitting an inert solvent (such as acetone, benzene, etc.) and substituting therefor an alkanol (such as methanol, ethanol, propanol, etc.), there are produced the corresponding 3α,5α-cycloandrostan-6β-alkoxy compounds of Formula VIII.

The 6β-ols (VIII) are converted to the corresponding 6β,17β-diol 6,17-diacylates (VIII) and 6β,17β-diol 6-monoacylates (VIII) in the same manner as shown for their 6α-ol counterparts (VIII) in (8), above.

(10) The 7-spirocyclopropyl-5-androsten-3β-ols (IX), prepared in (9), above, are preferentially oxidized at the 3-position by the Oppenauer method, in the manner described in J. Amer. Chem. Soc. 76, 5674, e.g., in a cyclohexanone and toluene solution, employing aluminum isopropoxide as catalyst, at reflux temperature, to yield the corresponding 7-spirocyclopropyl-4-androsten-3-ones (X).

(11) The thus produced compounds of Formula X, are converted to the corresponding 7-spirocyclopropyl-17β-hydroxy-5β-androstan-3-ones (XI) by hydrogenation of the Δ⁴-bond. For example, mixing the aforesaid 3-keto-Δ⁴-compounds of Formula X in a solvent such as 95% ethyl alcohol, at room temperature, in the presence of a hydrogenation catalyst such as 5% palladium on carbon, with hydrogen until one mole equivalent is consumed, yields the corresponding 3-keto-5β-androstanes (XI).

(12) The 7-spirocyclopropyl-5-androsten-3β-ols (IX) prepared in (9), above, are hydrogenated at the 5-position by known procedures, e.g., by mixing with hydrogen (at atmospheric pressure) in the presence of a catalyst such as platinum dioxide, to yield the corresponding 7-spirocyclopropyl-5α-androstan-3β-ols (XII).

(13) The 7-spirocyclopropyl-4-androsten-3-ones (X) prepared in (10), above, on treating with liquid ammonia and lithium in an alkanol, give the corresponding 7-spirocyclopropyl-5α-androstan-3 (α and β)-ols (XII). However, the compounds of Formula X, on treating with liquid ammonia and lithium in a solvent such as tetrahydrofuran, yield corresponding 7-spirocyclopropyl-5α-androstan-3-ones (XIII). The thus produced compounds of Formula XIII are reduced in known manner at the 3-position, e.g., with sodium borohydide, to yield the corresponding 7-spirocyclopropyl-5α-androstane-3 (α and β)-diols (XII). The compounds of Formula XII can be oxidized in known manner at the 3-position, e.g., with chromium trioxide, to yield the corresponding 7-spirocyclopropyl-5α-androstan-3-ones (XIII).

(14) The 7-spirocyclopropyl-5β-androstan-3-ones (XI) prepared in (11), above, are reduced in known manner at the 3-position, e.g., with sodium borohydride, to yield the corresponding 7-spirocyclopropyl-5β-androstan-3 (α and β)-ols (XIV).

The 3,17-diketo compounds of Formulae X, XI and XIII are converted to their corresponding 17α-alkyl, alkynyl, haloalkynyl, and alkenyl, derivatives essentially as described in the procedures of (3), above, but with an important variation. The aforesaid 3,17-diketones, prior to the formation of the above enumerated 17α-substituents, must first be converted to the corresponding 3-enamines, 3-ketals or 3-enol ethers in order to protect the 3-keto function from reduction. The 3-enamine formation can be carried out in the manner described in U.S. Pat. 2,781,343, namely, by reaction with a secondary cyclic alkyleneamine containing from five through seven ring atoms, such as pyrrolidine, piperidine, morpholine and their C-alkyl substituted derivatives such as 2,4-dimethylpyrrolidine, 3-propylpiperidine, 3-methylmorpholine, etc. Pyrrolidine is the preferred amine for use in this reaction.

Advantageously, the 3-enamines are prepared by heating one of the desired aforesaid 3,17-diketones and one of the appropriate secondary cyclic alkyleneamines together in the presence of a suitable solvent, for example, a lower alkanol such as methanol, ethanol, etc. The desired 3-enamines generally separate from their reaction mixtures and are isolated and dried. They are used, without further purification, in the next stage of the synthesis, which is identical to the procedures outlined in (b) through (f) of (3), above, to yield, after routine hydrolysis of the enamine, the corresponding 17α-alkyl, 17α-alkynyl, 17α-haloalkynyl and 17α-alkenyl-3-ketones of Formulae X, XI and XIII.

All of the compounds included within Formulae I through XIV of the flow-sheet, above, can be isolated from their respective reaction mixtures by conventional means, for example, when a water-miscible solvent is used, by pouring the reaction mixture into water and separating the resulting precipitate by filtration or by extraction with water-immiscible solvents. Additional purification of the products can be accomplished by conventional means, for example, by elution chromatography from an adsorbent column with a suitable solvent such as acetone, ethyl acetate, ether, methylene chloride and Skellysolve B (hexanes), mixtures and combinations of these solvents; also by gradient elution chromatography from an adsorbent column with a suitable mixture of solvents, such as, methylene chloride-Skellysolve B, acetone-Skellysolve B, and the like.

The compounds embraced by Formulae VIII through XIV possess the pharmacological activities recited above for those of Formulae VIII, IX and X, and are consequently useful in treating humans, mammals, birds and other animals in those conditions and/or ailments where such activities are desired. For example, in treating and preventing atherosclerosis, preventing pregnancy, increasing pelt size and quality in female mink, in treating osteoporosis, erythropenia, etc.

The compounds of Formulae VI and VII are useful as intermediates in preparing the pharmacologically active products of Formulae VIII through XIV.

The compounds of Formulae VIII through XIV of the invention can be prepared and administered to humans, mammals, birds and animals, in a wide variety of oral or parenteral dosage forms, singly or in admixture with other coacting compounds, in doses of about 1 to 1,000 mg. one to three times a day, depending on the severity of the condition being treated and the recipient's response to the medication. They can be administered with a pharmaceutical carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups or elixirs.

DETAILED DESCRIPTION

The following preparations and examples describe the manner and process of making and using the invention and set forth the best mode contemplated by the inventors of carrying out their invention, but are not to be construed as limiting the scope thereof.

PREPARATION 1

*19-nor-3,5-androstadiene-3,17β-diol 3,17-diacetate (b)*

A solution comprising 1 g. of 19-nor-17β-hydroxy-4-androsten-3-one (a) (also known as 19-nortestosterone or 17β-hydroxy-4-estren-3-one, and prepared as in J. Amer. Chem. Soc. 75, 5366), 40 mg. of paratoluenesulfonic acid, and 8 ml. of acetic anhydride in 20 ml. of toluene is refluxed under nitrogen for about 5 hours. Most of the solvent is removed with a stream of nitrogen to give a precipitate. A few milliliters of methanol containing a few drops of pyridine is added to the precipitate to yield crystals which are filtered, washed with cold methanol and dried to yield the desired product. This material is recrystallized by dissolving it in methylene chloride and diluting with methanol at room temperature to give pure 19-nor-3,5-androstadiene-3,17β-diol 3,17-diacetate (b).

PREPARATION 2

*19-nor-5-androstene-3β,17β-diol 17-acetate (c)*

To a solution of 0.5 g. of 19-nor-3,5-androstadiene-3,17β-diol 3,17-diacetate (b) (obtained in Preparation 1) in 15 ml. of 95% ethanol purged with nitrogen, a solution of 0.5 g. of sodium borohydride dissolved in 15 ml. of 95% alcohol (also purged of nitrogen) is added. The resulting solution is kept at room temperature for about 18 hours and then concentrated to a volume of about 20 ml. Dilute acetic acid (purged with nitrogen) is added. The product is extracted with ether, washed with dilute acid, water, dilute sodium hydroxide solution, again with water until the washings are neutral, dried over sodium sulfate and concentrated to dryness. Crystallization from acetone and Skellysolve B yields pure 19-nor-5-androstene-3β,17β-diol 17-acetate (c).

PREPARATION 3

*19-nor-5-androstene-3β,17β-diol 3-tetrahydropyranyl ether 17-acetate (d)*

To 1.8 g. of 19-nor-5-androstene-3β,17β-diol 17-acetate (c) (obtained as in Preparation 2) suspended in 10 ml. of dihydropyran and 50 ml. of ether, 100 mg. of paratoluenesulfonic acid is added. The ether solution is stored for about 16 hours, extracted with sodium bicarbonate solution, saturated sodium chloride solution, dried over anhydrous sodium sulfate and evaporated to dryness under reduced pressure to yield 19-nor-5-androstene-3β,17β-diol 3-tetrahydropyranyl ether 17-acetate (d).

PREPARATION 4

*19-nor-5-androstene-3β,17β-diol 3-tetrahydropyranyl ether (e)*

The residue of 19-nor-5-androstene-3β,17β-diol 3-tetrahydropyranyl ether (d) (obtained in Preparation 3) is dissolved in 100 ml. of 5% potassium carbonate in methanol water (4:1) solution and the reaction mixture heated to reflux for about 1.5 hours. The solvents are evaporated under reduced pressure to give a residue of 19 - nor - 5 - androstene - 3β,17β - diol 3 - tetrahydropyranyl ether (e).

PREPARATION 5

*19-nor-3β-hydroxy-5-androsten-17-one 3-tetrahydropyanyl ether (f)*

The residue of 19-nor-5-androstene-3β,17β-diol 3-tetrahydropyranyl ether (e) (obtained in Preparation 4) is taken up in 10 ml. of pyridine and added to pyridine-chromic acid complex prepared from 2 g. of chromic anhydride in 20 ml. of pyridine. The reaction mixture is stirred for about 16 hours at room temperature, diluted with a 1:1 mixture of ether and benzene and filtered on a Celite (diatomaceous earth) pad. The filtrate is washed successively with water and saturated sodium chloride solution, dried over anhydrous sodium sulfate and evaporated to dryness under reduced pressure, and the residual pyridine distilled azeotropically with toluene under reduced pressure to yield a residue of 19-nor-3β-hydroxy-5-androsten-17-one 3-tetrahydropyranyl ether (f).

PREPARATION 6

*19-nor-3β-hydroxy-5-androsten-17-one (I)*

The residue of 19-nor-3β-hydroxy-5-androsten-17-one 3-tetrahydropyranyl ether (f) (obtained in Preparation 5) is taken up in 20 ml. of acetone and 2 ml. of 3 N hydrochloric acid added thereto. The reaction mixture, after standing at room temperature for about 16 hours, is diluted with water and extracted with methylene chloride. The methylene chloride extract is washed with water, dried over sodium sulfate and the solvent evaporated under vacuum. The residue is purified by chromatography and recrystallized from acetone-Skellysolve B (hexanes) to give 19-nor-3β-hydroxy-5-androsten-17-one (I).

PREPARATION 7

*19-nor-3β-hydroxy-5-androsten-17-one 3-p-toluenesulfonate (II)*

A solution of 0.1 g. of 19-nor-3β-hydroxy-5-androsten-17-one (I) (obtained in Preparation 6) and 0.1 g. of p-toluenesulfonyl chloride in 1 ml. of pyridine is kept at room temperature for about 48 hours. An additional 50 mg. of p-toluenesulfonyl chloride is added to the reaction mixture and after about 4 hours water is added to precipitate the product. The product is collected, washed with water, dried and recrystallized from a mixture of acetone and Skellysolve B (hexanes) to yield 19-nor-3β-hydroxy-5-androsten-17-one 3-p-toluenesulfonate (II).

PREPARATION 8

*3β-hydroxy-5-androsten-17-one 3-p-toluenesulfonate (II)*

Following the procedure of Preparation 7 but substituting 3β-hydroxy-5-androsten-17-one (I) (prepared as in J. Amer. Chem. Soc. 57, 1379) as starting material, yields 3β-hydroxy-5-androsten-17-one 3-p-toluenesulfonate (II).

PREPARATION 9

*6β-hydroxy-19-nor-3α,5α-cycloandrostan-17-one (III)*

A solution of 0.3 g. of potassium acetate in 7 ml. of water and 7 ml. of acetone is purged with nitrogen and 0.1 g. of 19-nor-3β-hydroxy-5-androsten-17-one 3-p-toluenesulfonate (II) (obtained in Preparation 7) added. The mixture is heated at reflux temperature for about 6 hours and the acetone evaporated with a fast stream of nitrogen. The crude product (III) is chromatographed through a silica gel (silicic acid) column and recrystallized from aectone-Skellysolve B (hexanes) to give 6β-hydroxy-19-nor-3α,5α-cycloandrostan-17-one (III).

PREPARATION 10

*6β-hydroxy-3α,5α-cycloandrostan-17-one (III)*

Following the procedure of Preparation 9 but substituting 3β - hydroxy - 5 - androsten - 17 - one 3 - p - toluenesulfonate (II) (obtained in Preparation 8) as starting material, yields 6β-hydroxy-3α,5α-cycloandrostan-17-one (III).

PREPARATION 11

*19-nor-3α,5α-cycloandrostane-6β,17β-diol (III′)*

To a solution of 0.25 g. of 6β-hydroxy-19-nor-3α,5α-cycloandrostan-17-one (III) (obtained in Preparation 9)

in 10 ml. of methanol, 0.07 g. of sodium borohydride is added with cooling in an ice bath. After about ½ hour, water is added and the precipitated product is collected. The product is recrystallized twice from a mixture of acetone and Skellysolve B to give 19-nor-3α,5α-cycloandrostane-6β,17β-diol (III').

PREPARATION 12

*3α,5α-cycloandrostane-6β,17β-diol (III')*

Following the procedure of Preparation 11 but substituting 6β-hydroxy-3α,5α-cycloandrostan-17-one (III) (obtained in Preparation 8) as starting material, yields 3α,5α-cyclonandrostane-6β,17β-diol (III').

PREPARATION 13

*17α-methyl-19-nor-3α,5α-cycloandrostane-6β,17-diol (III')*

A solution of 0.1 g. of 19-nor-3α,5α-cyclonandrostane-6β-hydroxy-17-one (III) (obtained in Preparation 9) in 5 ml. of 2 N methylmagnesium bromide in a mixture of equal parts of benzene and tetrahydrofuran, is heated under reflux for about 18 hours. Most of the solvent is evaporated with a stream of nitrogen. The concentrated material remaining is poured into ice-water, acidified with dilute hydrochloric acid and extracted with ether. The extract is washed with sodium bicarbonate solution, water, dried, and the solvent removed. It is chromatographed through a column of neutral alumina. Unreacted starting material (III) is eluted first. The desired product is then eluted and crystallized from aqueous acetone to give 17α - methyl - 19 - nor - 3α,5α - cycloandrostane-6β,17β-diol (III').

Following the procedure of Preparation 13 but substituting for methylmagnesium bromide, other Grignard reagents, such as (1) ethylmagnesium chloride,
(2) isopropylmagnesium bromide,
(3) pentylmagnesium chloride,
(4) octylmagnesium bromide,
(5) undecylmagnesium chloride, etc., yields respectively, (1) 17α-ethyl-19-nor-3α,5α-cycloandrostane-6β,17β-diol (III'),
(2) 17α-isopropyl-19-nor-3α,5α-cycloandrostane-6β,17β-diol (III'),
(3) 17α-pentyl-19-nor-3α,5α-cycloandrotane-6β,17β-diol (III'),
(4) 17α-octyl-19-nor-3α,5α-cycloandrostane-6β,17β-diol (III'),
(5) 17α-undecyl-19-nor-3α,5α-cycloandrostane-6β,17β-diol (III'), etc.

PREPARATION 14

*17α-methyl-3α,5α-cycloandrostane-6β,17β-diol (III')*

Following the procedure of Preparation 13 but substituting 6β - hydroxy - 3α,5α - cycloandrostan - 17 - one (III) (obtained in Preparation 10) as starting material, yields 17α - methyl - 3α,5α - cyclonandrostane - 6β,17β-diol (III').

Following the procedure of Preparation 13 but substituting for methylmagnesium bromide, other Grignard reagents, such as (1) sec. butylmagnesium bromide,
(2) heptylmagnesium chloride,
(3) nonylmagnesium bromide,
(4) decylmagnesium chloride,
(5) dodecylmagnesium bromide, etc., yields, respectively, (1) 17α-sec. butyl-3α,5α-cycloandrostane-6β,17β-diol (III'),
(2) 17α-heptyl-3α,5α-cycloandrostane-6β,17β-diol (III'),
(3) 17α-nonyl-3α,5α-cycloandrostane-6β,17β-diol (III'),
(4) 17α-decyl-3α,5α-cycloandrostane-6β,17β-diol (III'),
(5) 17α-dodecyl-3α,5α-cycloandrostane-6β,17β-diol (III'), etc.

PREPARATION 15

*17α-ethynyl-19-nor-3α,5α-cycloandrostan-6β,17β-diol (III')*

A suspension of sodium acetylide (20% in xylene) is centrifuged and the sludge slurried with 10 ml. of dimethylsulfoxide. A mixture of 0.1 g. of 6β-hydroxy-19-nor-3α,5α-cycloandrostan-17-one (III) (obtained in Preparation 9) in 5 ml. of dimethylsulfoxide is mixed with the sodium acetylide. After keeping the mixture at room temperature for about a half hour it is stored in the refrigerator for about 16 hours. Water is added to the frozen mixture and the product extracted with ether. The extracts are washed successively with dilute acid, sodium bicarbonate solution, and water, and the solvent then removed to give an oily residue. The residue is chromatographed through neutral alumina; recrystallization of the crude product gives pure 17α-ethynyl-19-nor-3α,5α-cycloandrostane-6β,17β-diol (III').

Following the procedure of Preparation 15 but substituting for sodium acetylide, other alkynylating agents, such as (1) sodium methylacetylide,
(2) sodium trifluoromethylacetylide,
(3) sodium propylacetylide,
(4) lithium acetylide,
(5) sodium butylacetylide, etc., yields, respectively, (1) 17α(1-propynyl)-19-nor-3α,5α-cycloandrostane-6β,17β-diol (III'),
(2) 17α-trifluoromethylethynyl-19-nor-3α,5α-cycloandrostane-6β,17β-diol (III'),
(3) 17α(1-pentynyl)-19-nor-3α,5α-cycloandrostane-6β,17β-diol (III'),
(4) 17α-ethynyl-19-nor-3α,5α-cycloandrostane-6β,17β-diol (III'),
(5) 17α(1-hexynyl)-19-nor-3α,5α-cycloandrostane-6β,17β-diol (III'), etc.

PREPARATION 16

*17α-ethynyl-3α,5α-cycloandrostane-6β,17β-diol (III')*

Following the procedure of Preparation 15 but substituting 6β-hydroxy - 3α,5α - cycloandrostan-17-one (III) (obtained in Preparation 10) as starting material, yields 17α-ethynyl-3α,5α-cycloandrostane-6β,17β-diol (III').

Following the procedure of Preparation 16 but substituting for sodium acetylide, other alkynylating agents, such as (1) sodium ethylacetylide,
(2) sodium propylacetylide,
(3) sodium bromoacetylide,
(4) sodium chloroacetylide,
(5) sodium trifluoromethylacetylide, etc., yields, respectively, (1) 17α(1-butynyl)-3α,5α-cycloandrostane-6β,17β-diol (III'),
(2) 17α(1-pentynyl)-3α,5α-cycloandrostane-6β,17β-diol (III'),
(3) 17α-bromoethynyl-3α,5α-cycloandrostane-6β,17β-diol (III'),
(4) 17α-chloroethynyl-3α,5α-cycloandrostane-6β,17β-diol (III'),
(5) 17α-trifluoromethylethynyl-3α,5α-cycloandrostane-6β,17β-diol (III'), etc.

PREPARATION 17

*17α-vinyl-19-nor-3α,5α-cycloandrostan-6β,17β-diol (III')*

A catalyst comprising a suspension of 100 mg. of 1% palladium on charcoal in 30 ml. of dioxane (purified by passage through a column of alumina) is reduced at atmospheric pressure with hydrogen. A solution of 0.4 g. of 17α-ethynyl-19-nor-3α,5α-cycloandrostane-6β,17β-diol (III′) (obtained as in Preparation 15) in 5 ml. of dioxane is injected through a rubber stopper into the reaction flask containing the catalyst. Hydrogenation is continued until 1 mole (33.25 ml.) of hydrogen is consumed at atmospheric pressure. The catalyst is removed by filtration and the filtrate concentrated to dryness on a rotary evaporator. The residue is chromatographed through a column of 125 g. of Florisil (synthetic magnesium silicate). The eluted material is recrystallized from aqueous methanol. Recrystallization from the same solvent gives 17α-vinyl-19-nor-3α,5α-cycloandrostan-6β,17β-diol (III′).

Following the procedure of Preparation 17 but substituting other 17α-alkynyl compounds as starting materials, such as (1) 17α(1-propynyl)-19-nor-3α,5α-cycloandrostane-6β,17β-diol (III′),
(2) 17α-trifluoromethylethynyl-19-nor-3α,5α-cycloandrostane-6β,17β-diol (III′), etc., yields, respectively, (1) 17α(1-propenyl)-19-nor-3α,5α-cycloandrostane-6β,17β-diol (III′),
(2) 17α-trifluoromethylvinyl-19-nor-3α,5α-cycloandrostane-6β,17β-diol (III′), etc.

PREPARATION 18

*17α-vinyl-3α,5α-cycloandrostan-6β,17β-diol (III′)*

Following the procedure of Preparation 17 but substituting 17α-ethynyl-3α,5α-cycloandrostane-6β,17β-diol (III′) (obtained in Preparation 16) as starting material, yields 17α-vinyl-3α,5α-cycloandrostan-6β,17β-diol (III′).

Following the procedure of Preparation 18 but substituting the other 17α-alkynyl compounds as starting materials, such as (1) 17α(1-butynyl)-3α,5α-cycloandrostane-6β,17β-diol (III′),
(2) 17α(1-pentynyl)-3α,5α-cycloandrostane-6β,17β-diol (III′), etc., yields, respectively, (1) 17α(1-butenyl)-3α,5α-cycloandrostane-6β,17β-diol (III′),
(2) 17α(1-pentenyl)-3α,5α-cycloandrostane-6β,17β-diol (III′), etc.

PREPARATION 19

*19-nor-3α,5α-cycloandrostane-6β,17β-diol 6,17-diacetate (III′)*

A solution of 1 g. of 19-nor-3α,5α-cycloandrostane-6β,17β-diol (III′) (obtained in Preparation 11) in 1 ml. of pyridine and 1 ml. of acetic anhydride is kept at room temperature for about 16 hours. Ice and water are added and the product extracted with ether. The ether extract is washed successively with dilute hydrochloric acid, water, dilute sodium bicarbonate solution, water and dried over magnesium sulfate. The organic solvent is removed by vacuum distillation and the residue recrystallized from methanol to yield 19-nor-3α,5α-cycloandrostane-6β,17β-diol 6,17-diacetate (III′).

Following the procedure of Preparation 19 but substituting for acetic anhydride another anhydride, such as propionic, butyric, valeric, hexanoic, trimethylacetic, isobutyric, isovaleric, cyclohexanecarboxylic, p-hexylpropionic, benzoic, phenylacetic, acrylic, crotonic, undecylenic, propiolic, cinnamic, maleic, citraconic, etc., yields, respectively, the corresponding 19-nor-3α,5α-cycloandrostane-6β,17β-diol 6,17-diacylate (III′).

If desired, the diacylation can be conducted for about six hours at reflux and with additional procedures such as chromatography or fractional crystallization.

PREPARATION 20

*3α,5α-cycloandrostane-6β,17β-diol 6,17-diacetate (III′)*

Following the procedure of Preparation 19, but substituting 3α,5α-cycloandrostane-6β,17β-diol (III′) (obtained in Preparation 12) as starting material, yields 3α,5α-cycloandrostane-6β,17β-diol 6,17-diacetate (III′).

Following the procedure of Preparation 20 but substituting for acetic anhydride another anhydride such as isobutyric, trimethylpropionic, phenylvaleric, cinnamic, citraconic, etc., yields, respectively, the corresponding 3α,5α-cycloandrostane-6β,17β-diol 6,17-diacylate (III′).

PREPARATION 21

*19-nor-3α,5α-cycloandrostane-6,17-dione (IV)*

A solution of 0.1 g. of 6β-hydroxy-19-nor-3α,5α-cycloandrostan-17-one (III) (obtained in Preparation 9) in 25 ml. of acetone is cooled in an ice bath and 1 ml. of Jones reagent (8 N chromium trioxide in concentrated sulfuric acid diluted with water, prepared as in J. Org. Chem. 21, 1547) added. After about 10 minutes, the excess oxidant is destroyed by the addition of 1 ml. of isopropyl alcohol. Water is added and the acetone evaporated under a stream of nitrogen. The precipitated product is collected on a filter, washed with water and dried to yield 19-nor-3α,5α-cycloandrostane-6,17-dione (IV).

PREPARATION 22

*3α,5α-cycloandrostane-6,17-dione (IV)*

Following the procedure of Preparation 21 but substituting 6β-hydroxy-3α,5α-cycloandrostan-17-one (III) (obtained in Preparation 10) as starting material, yields 3α,5α-cycloandrostane-6,17-dione (IV).

PREPARATION 23

*17β-hydroxy-19-nor-3α,5α-cycloandrostan-6-one (IV)*

A solution of 0.1 g. of 19-nor-3α,5α-cycloandrostane-6β,17β-diol (III′) (obtained in Preparation 11) in 10 ml. of ethyl acetate is shaken for about 72 hours with 1 g. of manganese dioxide, prepared in accordance with the procedure described in J. Chem. Soc. 1104 (1951). After the shaking period, the mixture is filtered, the filter cake washed with three 1 ml. portions of ethyl acetate, the filtrate and additional ethyl acetate washings combined, and the solvent removed under vacuum. The crystalline residue obtained is dissolved in methylene chloride and chromatographed over a column of Florisil to give 17β-hydroxy-19-nor-3α,5α-cycloandrostan-6-one (IV).

PREPARATION 24

*17β-hydroxy-3α,5α-cycloandrostan-6-one (IV)*

Following the procedure of Preparation 23 but substituting 3α,5α-cycloandrostane-6β,17β-diol (III′) (obtained in Preparation 12) as starting material, yields 17β-hydroxy-3α,5α-cycloandrostan-6-one (IV).

PREPARATION 25

*17β-hydroxy-17α-methyl-19-nor-3α,5α-cycloandrostan-6-one (IV)*

A solution of 0.1 g. of 17α-methyl-19-nor-3α,5α-cycloandrostane-6β,17β-diol (III′) (obtained in Preparation 13) in 25 ml. of acetone is cooled in an ice bath and 1 ml. of Jones reagent added. After about 10 minutes the excess oxidant is destroyed by the addition of 1 ml. of isopropyl alcohol. Water is added and the acetone evaporated under a stream of nitrogen. The precipitated product is collected on a filter, washed with water and dried to yield 17β-hydroxy-17α-methyl-19-nor-3α,5α-cycloandrostan-6-one (IV).

Following the procedure of Preparation 25 but substituting other corresponding 17α-alkyl compounds (III′) as starting materials, such as (1) 17α-ethyl-10-nor-3α,5α-cycloandrostane-6β,17β-diol (III'),
(2) 17α-butyl-19-nor-3α,5α-cycloandrostane-6β,17β-diol (III'),
(3) 17α-undecyl-19-nor-3α,5α-cycloandrostane-6β,17β-diol (III'), etc., yields, respectively, (1) 17β-hydroxy-17α-ethyl-19-nor-3α,5α-cycloandrostan-6-one (IV),
(2) 17β-hydroxy-17α-butyl-19-nor-3α,5α-cycloandrostan-6-one (IV),
(3) 17β-hydroxy-17α-undecyl-19-nor-3α,5α-cycloandrostan-6-one (IV), etc.

PREPARATION 26

*17β-hydroxy-17α-methyl-3α,5α-cycloandrostan-6-one (IV)*

Following the procedure of Preparation 25 but substituting 17α-methyl - 3α,5α - cycloandrostane-6β,17β-diol (III') (obtained in Preparation 14) as starting material, yields 17β-hydroxy - 17α - methyl-3α,5α-cycloandrostan-6-one (IV).

Following the procedure of Preparation 26 but substituting other corresponding 17α-alkyl compounds (III') as starting materials, such as (1) 17α-propyl-3α,5α-cycloandrostane-6β,17β-diol (III'),
(2) 17α-pentyl-3α,5α-cycloandrostane-6β,17β-diol (III'),
(3) 17α-dodecyl-3α,5α-cycloandrostane-6β,17β-diol (III'), etc., yields, respectively, (1) 17β-hydroxy-17α-propyl-3α,5α-cycloandrostan-6-one (IV),
(2) 17β-hydroxy-17α-pentyl-3α,5α-cycloandrostan-6-one (IV),
(3) 17β-hydroxy-17α-dodecyl-3α,5α-cycloandrostan-6-one (IV), etc.

PREPARATION 27

*17β-hydroxy-17α-ethynyl-19-nor-3α,5α-cycloandrostan-6-one (IV)*

A solution of 0.1 g. of 17α-ethynyl-19-nor-3α,5α-cycloandrostan-6β,17β-diol (III') (obtained in Preparation 15) in 15 ml. of acetone is cooled in an ice bath and 1 ml. of Jones reagent added. After about 10 minutes the excess oxidant is destroyed by the addition of 1 ml. of isopropyl alcohol. Water is added and the acetone evaporated under a stream of nitrogen. The precipitated product is collected on a filter, washed with water and dried to yield 17β-hydroxy - 17α - ethynyl - 19 - nor-3α,5α-cycloandrostan-6-one (IV).

Following the procedure of Preparation 27 but substituting other corresponding 17α-alkynyl compounds (III') as starting materials, such as (1) 17α(1-propynyl)-19-nor-3α,5α-cycloandrostane-6β,17β-diol (III'),
(2) 17α(1-butynyl)-19-nor-3α,5α-cycloandrostane-6β,17β-diol (III'),
(3) 17α-trifluoromethylethynyl-19-nor-3α,5α-cycloandrostane-6β,17β-diol (III'), etc., yields, respectively, (1) 17β-hydroxy-17α(1-propynyl-19-nor-3α,5α-cycloandrostan-6-one (IV),
(2) 17β-hydroxy-17α(1-butynyl)-19-nor-3α,5α-cycloandrostan-6-one (IV),
(3) 17β-hydroxy-17α-trifluoromethylethynyl-19-nor-3α,5α-cycloandrostan-6-one (IV), etc.

PREPARATION 28

*17β-hydroxy-17α-ethynyl-3α,5α-cycloandrostan-6-one (IV)*

Following the procedure of Preparation 27 but substituting 17α-ethynyl - 3α,5α - cycloandrostane-6β,17β-diol (III') (obtained in Preparation 16) as starting material yields 17β - hydroxy - 17α - ethynyl-3α,5α-cycloandrostan-6-one (IV).

Following the procedure of Preparation 28 but substituting other corresponding 17α-alkynyl compounds (III') as starting materials, such as (1) 17α(1-butynyl)-3α,5α-cycloandrostane-6β,17β-diol (III'),
(2) 17α-trifluoromethylethynyl-3α,5α-cycloandrostane-6β,17β-diol (III'),
(3) 17α-chloroethynyl-3α,5α-cycloandrostane-6β,17β-diol (III'), etc., yields, respectively, (1) 17β-hydroxy-17α(1-butynyl)-3α,5α-cycloandrostane-6-one (IV),
(2) 17β-hydroxy-17α-trifluoromethylethynyl-3α,5α-cycloandrostan-6-one (IV),
(3) 17β-hydroxy-17α-chloroethynyl-3α,5α-cycloandrostan-6-one (IV), etc.

PREPARATION 29

*17β-hydroxy-17α-vinyl-19-nor-3α,5a-cycloandrostan-6-one (IV)*

A solution of 0.1 g. of 17α-vinyl-19-nor-3α,5α-cycloandrostan-6β,17β-diol (III') (obtained in Preparation 17; in 25 ml. of acetone is cooled in an ice bath and 1 ml. of Jones reagent added. After about 10 minutes the excess oxident is destroyed by the addition of 1 ml. of isopropyl alcohol. Water is added and the acetone evaporated under a stream of nitrogen. The precipitated product is collected on a filter, washed with water and dried to yield 17β-hydroxy-17α-vinyl-19-nor-3α,5α-cycloandrostan-6-one (IV).

Following the procedure of Preparation 29 but substituting other corresponding 17α-alkenyl compounds (III') as starting materials, such as (1) 17α(3-octenyl)-19-nor-3α,5α-cycloandrostane-6β,17β-diol (III'),
(2) 17α(4-decenyl)-19-nor-3α,5α-cycloandrostane-6β,17β-diol (III'),
(3) 17α-trifluoromethylvinyl-19-nor-3α,5α-cycloandrostane-6β,17β-diol (III'), etc., yields, respectively, (1) 17β-hydroxy-17α(3-octenyl)-19-nor-3α,5α-cycloandrostan-6-one (IV),
(2) 17β-hydroxy-17α(4-decenyl)-19-nor-3α,5α-cycloandrostan-6-one (IV),
(3) 17β-hydroxy-trifluoromethylvinyl-19-nor-3α,5α-cycloandrostan-6-one (IV), etc.

PREPARATION 30

*17β-hydroxy-17α-vinyl-3α,5α-cycloandrostan-6-one (IV)*

Following the procedure of Preparation 29 but substituting 17α-vinyl - 3α,5α - cycloandrostan - 6β,17β - diol (III') (obtained in Preparation 18) as starting material, yields 17β-hydroxy-17α-vinyl-3α,5α-cycloandrostan-6-one (IV).

Following the procedure of Preparation 30 but substituting other corresponding 17α-alkenyl compounds (III') as starting materials, such as (1) 17α(1-propenyl)-3α,5α-cycloandrostane-6β,17β-diol (III'),
(2) 17α-trifluoromethylvinyl-3α,5α-cycloandrostane-6β,17β-diol (III'), etc., yields, respectively, (1) 17β-hydroxy-17α(1-propenyl)-3α,5α-cyclo-
androstan-6-one (IV),
(2) 17β-hydroxy-17α-trifluoromethylvinyl-3α,5α-cyclo-
androstan-6-one (IV), etc.

PREPARATION 31

*17β-hydroxy-19-nor-3α,5α-cycloandrostan-6-one 17-acetate (IV)*

A solution of 0.2 g. of 19-nor-3α,5α-cycloandrostane-6β,17β-diol 6,17-diacetate (III') (obtained in Preparation 19) in 10 ml. of acetone is cooled to about 10° C. and 2 ml. of Jones reagent added with swirling. The mixture is kept for about 16 hours at about 5° C., then poured into iced water and the resulting suspension filtered. The solid material on the filter is washed with water, dried and crystallized from methanol to give 17β-hydroxy-19-nor-3α,5α-cycloandrostan-6-one 17-acetate (IV).

Following the procedure of Preparation 31 but substituting other 19-nor-3α,5α-cycloandrostane-6β,17β-diol 6,17-diacylates (III'), such as the corresponding 6,17-dipropionate; 6-butyrate, 17-isovalerate; 6,17-dibenzoate; 6-p-hexylpropionate, 17-cinnamate; 6,17-diundecylenate; 6-propiolate, 17-acetate; 16,17-dicrotonate, etc., yields the corresponding 19-nor-3α,5α - cycloandrostan-17β-ol-6-one 17-acylate (IV).

PREPARATION 32

*17β-hydroxy-3α,5α-cycloandrostan-6-one 17-acetate (IV)*

Following the procedure of Preparation 31 but substituting 3α,5α-cycloandrostane-6β,17β-diol 6,17-diacetate (III') (obtained in Preparation 20) as starting material, yields 17β-hydroxy-3α,5α-cycloandrostan-6-one 17-acetate (IV).

Following the procedure of Preparation 32 but substituting other 3α,5α-cycloandrostane-6β,17β-diol 6,17-diacylates (III') such as the corresponding 6,17-dibutyrate; 6-valerate, 17-hexanoate; 6,17-diphenylacetate; 6-acrylate, 17-maleate; 6,17-dicitraconate; 6-cinnamate, 17-propionate; 16,17-didecylenate, etc., yields the corresponding 17β-hydroxy-3α,5α-cycloandrostan-6-one 17-acylate (IV).

PREPARATION 33

*17β - hydroxy-19-nor-3α,5α-cycloandrostan-6-one 17-acetate (IV)*

A solution of 0.7 g. of 17β-hydroxy-19-nor-3α,5α-cycloandrostan-6-one (IV) (obtained as in Preparation 12) in 1.4 ml. of pyridine and 0.7 ml. of acetic anhydride is kept at room temperature for about 16 hours. Water is slowly added to the reaction mixture and the product extracted with methylene chloride, washed with aqueous sodium chloride solution until nearly neutral, dried and the solvent removed. The residue is chromatographed through a column of Florisil to give 17β-hydroxy-19-nor-3α,5α-cycloandrostan-6-one 17-acetate (IV).

Similarly, by reacting 17β-hydroxy-19-nor-3α,5α-cycloandrostan-6-one (IV) with the appropriate hydrocarbon carboxylic acid anhydride, for example, at temperatures between about 30° and 150° C. using the above procedure there are produced other 17-acylates thereof such as 17-propionate, 17-butyrate, 17-valerate, 17-hexanoate, 17-trimethylacetate, 17-isobutyrate, 17-isovalerate, 17-cyclohexanecarboxylate, 17-cyclopentylpropionate, 17-phenylpropionate, 17-p-hexyloxypropionate, 17-benzoate, 17-hemisuccinate, 17-phenylacetate, 17-acrylate, 17-crotonate, 17-undecylenate, 17-propiolate, 17-cinnamate, 17-maleate and 17-citraconate.

PREPARATION 34

*17β-hydroxy-3α,5α-cycloandrostan-6-one 17-acetate (IV)*

Following the procedure of Preparation 33 but substituting 17β-hydroxy-3α,5α-cycloandrostan-6-one (IV) (obtained as in Preparation 14) as starting material, yields 17β-hydroxy-3α,5α-cycloandrostan-6-one 17-acetate (IV).

Following the procedures of Preparation 34 and the paragraph immediately preceding it, yields other 17-acylates of 17β-hydroxy-3α,5α-cycloandrostan-6-one (IV), e.g., its 17-butyrate, 17-isovalerate, 17-phenylacetate, 17-propiolate, etc.

PREPARATION 35

*17β-hydroxy-19-nor-3α,5α-cycloandrostan-6-one (IV)*

100 mg. of 19-nor-3α,5α-cycloandrostan-17β-ol-6-one 17-acetate (IV) (obtained in Preparation 33) is dissolved in 4 ml. of 5% potassium hydroxide in methanol, followed by the addition of 4 drops of water. After standing for about 16 hours at room temperature, the solution is warmed on a steam bath and diluted to incipient crystallization by the dropwise addition of water. Recrystallization of this material from alcohol and water gives pure 17β-hydroxy-19-nor-3α,5α-cycloandrostan-6-one (IV).

Following the procedure of Preparation 35 but sustituting other 17-acylates of 17β-hydroxy-19-nor-3α,5α-cycloandrostan-6-one (IV) as starting materials, e.g., those recited in the paragraph immediately preceding Preparation 34, also yields 17β-hydroxy-19-nor-3α,5α-cycloandrostan-6-one (IV).

PREPARATION 36

*17β-hydroxy-3α,5α-cycloandrostan-6-one (IV)*

Following the procedure of Preparation 35 but substituting 17β-hydroxy-3α,5α-cycloandrostan-6-one 17-acetate (obtained in Preparation 34) as starting material, yields 17β-hydroxy-3α,5α-cycloandrostan-6-one (IV).

Following the procedure of Preparation 36 but substituting other 17-acylates of 17β-hydroxy-3α5α-cycloandrostan-6-one (IV) as starting material, e.g. those recited in the paragraph immediately preceding Preparation 34, also yields 17β-hydroxy-3α,5α-cycloandrostan-6-one (IV).

PREPARATION 37

*17β - hydroxy-17α-methyl-19-nor-3α,5α-cycloandrostan-6-one 17-acetate (IV)*

A solution of 0.7 g. of 17β-hydroxy-17α-methyl-19-nor-3α,5α-cycloandrostan-17α-methyl-6-one (IV) (obtained as in Preparation 25) in 1.4 m. of pyridine and 0.7 ml. of acetic anhydride is heated at about 80° C. for about 16 hours. Water is slowly added to the reaction mixture and the product extracted with methylene chloride, washed with aqueous sodium chloride until nearly neutral, dried and the solvent removed. The oily residue is chromatographed through a column of Florisil giving 17β-hydroxy-17α methyl-19-nor-3α,5α-cycloandrostan-6-one 17-acetate (IV).

Similarly, by reacting 17β-hydroxy-17α-methyl-19-nor-3α,5α-cycloandrostan-6-one (IV) with the appropriate hydrocarbon carboxylic acid anhydride, for example, at temperatures between about 60° and 150° C. using the above procedure there are produced other 17-acylates thereof such as 17-propionate, 17-butyrate, 17-valerate, 17-hexanoate, 17-trimethylacetate, 17-isobutyrate, 17-isovalerate, 17-cyclohexanecarboxylate, 17-cyclopentylpropionate, 17-phenylpropionate, 17-p-hexyloxy-β propionate, 17-benzoate, 17-phenylacetate, 17-acrylate, 17-crotonate, 17-undecylenate, 17-propiolate, and 17-cinnamate.

Following the procedures of the immediately preceding paragraph and of Preparation 37 but substituting other coresponding 17-alkyl starting compounds (IV) and other acid anhydrides of hydrocarbon carboxylic acids, such as (1) 17β - hydroxy - 17α-dodecyl-19-nor-3α,5α-cycloandrostan-6-one (IV) and propionic anhydride,
(2) 17β-hydroxy-17α-pentyl-19-nor-3α,5α-cycloandrostan-6-one (IV) and benzoic anhydride,
(3) 17β - hydroxy-17α-ethyl-19-nor-3α,5α-cycloandrostan-6-one (IV) and cyclopentylpropionic anhydride, etc., yields respectively, (1) 17β - hydroxy - 17α-dodecyl-19-nor-3a,5α-cycloandrostan-6-one 17-propionate (IV), (2) 17β-hydroxy-17α-pentyl-19-nor-3α,5α-cycloandrostan-6-one 17-benzoate (IV),
(3) 17β-hydroxy-17α-ethyl-19-nor-3α,5α-cycloandrostan-6-one 17-cyclopentylpropionate (IV), etc.

PREPARATION 38

*3α,5α-cycloandrostane-17α-methyl-17β-ol-6-one 17-acetate (IV)*

Following the procedure of Preparation 37 but substituting 17β-hydroxy-17α-methyl-3α,5α-cycloandrostan-6-one (IV) (obtained in Preparation 16) as starting material, yields 17β-hydroxy-17α-methyl-3α,5α-cycloandrostan-6-one 17-acetate (IV).

Following the procedures of Preparation 38 and the two paragraphs immediately preceding it, yields other 17β-hydroxy-17α-alkyl-3α,5α-cycloandrostan-6-one 17-acylates (IV), e.g., 17β-hydroxy-butyl-3α,5α-cycloandrostan-6-one 17-hexanoate (IV), 17β-hydroxy-17α-heptyl-3α,5α-cycloandrostan-6-one 17-phenylbutyrate (IV), 17β-hydroxy-17α-decyl-3α,5α-cycloandrostan-6-one 17-dodecanoate (IV), etc.

PREPARATION 39

*17β-hydroxy-17α-ethynyl-19-nor-3α,5α-cycloandrostan 6-one-17-acetate (IV)*

A solution of 0.7 g. of 17β-hydroxy-17α-ethynyl-19-nor-3α,5α-cycloandrostan-6-one (IV) (obtained as in Preparation 17) in 1.4 ml. of pyridine and 0.7 m. of acetic anhydride is heated at about 60° C. for about 16 hours. Water is slowly added to the reaction mixture and the product extracted with methylene chloride, washed with aqueous sodium chloride until nearly neutral, dried and the solvent removed. The oily residue is chromatographed through a column of Florisil to give 17β-hydroxy-17α-ethynyl-19-nor-3α,5α-cycloandrostan-6-one 17-acetate (IV).

Similarly, by reacting 17β-hydroxy-17α-ethynyl-19-nor-3α,5α-cycloandrostan-6-one (IV) with the appropriate hydrocarbon carboxylic acid anhydride, for example, at temperatures between about 30° and 150° C. using the above procedure there are produced other 17-acylates thereof such as 17-propionate, 17-butyrate, 17-valerate, 17-hexanoate, 17-trimethylacetate, 17-isobutyrate, 17-isovalerate, 17 - cyclohexanecarboxylate, 17 - cyclopentylpropionate, 17-phenylpropionate, 17-p-hexyloxypropionate, 17-benzoate, 17-phenylacetate, 17-acrylate, 17-crotonate, 17-undecylenate, 17-propiolate, 17-cinnamate, 17-maleate and 17-citraconate.

Following the procedures of the immediately preceding paragraph and of Preparation 39 but substituting other corresponding 17α-alkynyl starting compounds (IV) and other acid anhydrides of hydrocarbon carboxylic acids, such as (1) 17β-hydroxy-17α(2-butynyl)-19-nor-3α,5α-cycloandrostran-6-one (IV) and isovaleric anhydride,
(2) 17β-hydroxy-17α-chloroethynyl-19-nor-3α,5α-cycloandrostan-6-one (IV) and hexyloxypropionic anhydride,
(3) 17β-hydroxy-17α-trifluoromethylethynyl-19-nor-3α,5α-cycloandrostan-6-one (IV) and acrylic anhydride, etc., yields, respectively, (1) 17β-hydroxy-17α(2-butynyl)-19-nor-3α,5α-cycloandrostan-6-one 17-isovalerate (IV),
(2) 17β-hydroxy-17α-chloroethynyl-19-nor-3α,5α-cycloandrostan-6-one 17-hexyloxypropionate (IV),
(3) 17β-hydroxy-17α-trifluoromethylethynyl-19-nor-3α,5α-cycloandrostan-6-one 17-acrylate (IV), etc.

PREPARATION 40

*17β-hydroxy-17α-alkynyl-3α,5α-cycloandrostan-6-one 17-acetate (IV)*

Following the procedure of Preparation 39 but substituting 17β-hydroxy-17α-ethynyl-3α,5α-cycloandrostan-6-one (IV) (obtained in Preparation 28) as starting material, yields 17β-hydroxy-17α-ethynyl-3α,5α-cycloandrostan-6-one 17-acetate (IV).

Following the procedures of Preparation 40 and the two paragraphs immediately preceding it, yields other 17β-hydroxy-17α-alkynyl-3α,5α-cycloandrostan-6-one 17-acylates (IV), e.g., 17β-hydroxy-17α(2-propynyl)-3α,5α-cycloandrostan - 6 - one 17-propionate, 17β-hydroxy-17α-bromoethynyl - 3α,5α - cycloandrostan-6-one 17-phenylacetate, 17β - hydroxy-17α-trifluoromethylethynyl-3α,5α-cycloandrostan-6-one 17-benzoate (IV), etc.

PREPARATION 41

*17β-hydroxy-17α-vinyl-19-nor-3α,5α-cycloandrostan-6-one 17-acetate (IV)*

To a solution 0.1 g. of 17β-hydroxy-17α-vinyl-19-nor-3α,5α-cycloandrostan-6-one (IV) (obtained in Preparation 19) in 5 m. of methylene chloride and 0.1 ml. of pyridine, 0.1 g. of acetyl chloride is added. After standing for about 1.25 hours at room temperature, the solution is washed successively with water, dilute acid, dilute base, water, dried over magnesium sulfate and the solvent removed. The residue is chromatographed over a column of Florisil and crystallized from acetone-Skellysolve B to give 17β-hydroxy-17α-vinyl-19-nor-3α,5α-cycloandrostan-6-one 17-acetate (IV).

Following the procedure of Preparation 41 but substituting other 17α-alkenyl compounds (IV) as starting materials and other appropriate halides or anhydrides of hydrocarbon carboxylic acids, such as (1) 17β-hydroxy-17α(2-butenyl)-19-nor-3α,5α-cycloandrostan-6-one (IV) and valeryl chloride,
(2) 17β-hydroxy-17α(1-propenyl)-19-nor-3α,5α-cycloandrostan-6-one (IV) and hexanoic anhydride,
(3) 17β-hydroxy-17α-trifluoromethylvinyl-19-nor-3α,5α-cycloandrostan-6-one (IV) and isobutyryl chloride, etc., yields, respectively, (1) 17β-hydroxy-17α(2-butenyl)-19-nor-3α,5α-cycloandrostan-6-one 17-valerate (IV),
(2) 17β-hydroxy-17α(1-propenyl)-19-nor-3α,5α-cycloandrostan-6-one 17-hexanoate (IV),
(3) 17β-hydroxy-17α-trifluoromethylvinyl-19-nor-3α,5α-cycloandrostan-6-one 17-isobutyrate (IV), etc.

PREPARATION 42

*17β-hydroxy-17α-vinyl-3α,5α-cycloandrostan-6-one 17-acetate (IV)*

Following the procedure of Preparation 41 but substituting 17β-hydroxy-17α-vinyl-3α,5α-cycloandrostan-6-one (IV) (obtained in Preparation 30) as starting material, yields 17β-hydroxy-17α-vinyl-3α,5α-cycloandrostan-6-one 17-acetate (IV).

Following the procedure of Preparation 42 and the paragraph immediately preceding it, yields other 17β-hydroxy-17α-alkenyl-3α,5α-cycloandrostan-6-one 17-acylates (IV), e.g., 17β - hydroxy-17α(1-propenyl)-3α,5α-cycloandrostan-6-one 17-isobutyrate (IV), 17β-hydroxy-17α-(2-decenyl)-3α,5α-cycloandrostan - 6 - one 17 - phenylpropionate (IV), 17β-hydroxy-17α-trifluoromethylvinyl-3α,5α-cycloandrostan-6-one 17-hexanoate (IV), etc.

PREPARATION 43

*7-methylene-19-nor-3α,5α-cycloandrostane-6,17-dione (V)*

A mixture of 0.4 g. of 19-nor-3α,5α-cycloandrostane-6,17-dione (IV) (obtained in Preparation 21), 0.2 g. of dimethylammonium chloride, 0.8 g. of paraformaldehyde and 70 ml. of dioxane is stirred with heating at reflux temperature for about 4 hours and poured into about 700 ml. of water. The resulting precipitate is collected, dissolved in methylene chloride and the solution washed first with dilute aqueous hydrochloric acid and then water.

Evaporation of the methylene chloride and crystallization of the residue from diisopropyl ether gives the product, 7 - methylene - 19-nor-3α,5α-cycloandrostane-6,17-dione (V).

PREPARATION 44

*7-methylene-3α,5α-cycloandrostane-6,17-dione (V)*

Following the procedure of Preparation 43 but substituting 3α,5α-cycloandrostane-6,17-dione (IV) (obtained in Preparation 22) as starting material, yields 7-methylene-3α,5α-cycloandrostane-6,17-dione (V).

PREPARATION 45

*17β-hydroxy - 7 - methylene-19-nor-3α,5α-cycloandrostan-6-one 17-acetate (V)*

Following the procedure of Preparation 43 but substituting 17β - hydroxy-19-nor-3α,5α-cycloandrostan-6-one 17-acetate (IV) (obtained in Preparation 33) as starting material, yields 17β-hydroxy - 7 - methylene-19-nor-3α,5α-cycloandrostan-6-one 17-acetate (V).

Similarly, substituting other 17-acylates of 17β-hydroxy-19-nor-3α,5α-cycloandrostan-6-one (IV), such as the 17-propionate, 17-trimethylacetate, 17-isovalerate, 17-phenylacetate, 17-crotonate, 17-benzoate, 17-hemisuccinate, etc., for the 17-acetate employed as starting material in the preceding paragraph, yields the corresponding 17β-hydroxy-7-methylene-19-nor-3α,5α-cycloandrostan-6-one 17-acylate (V).

PREPARATION 46

*17β-hydroxy - 7 - methylene-3α,5α-cycloandrostan-6-one 17-acetate (V)*

Following the procedure of Preparation 43 but substituting 17β-hydroxy-3α,5α-cycloandrostan-6-one 17-acetate (IV) (obtained in Preparation 34) as starting material, yields 17β - hydroxy-7-methylene-3α,5α-cycloandrostan-6-one 17-acetate (V).

Substituting other 17 - acylates of 17β-hydroxy-3α,5α-cycloandrostan-6-one (IV), such as the 17-butyrate, 17-valerate, 17-propiolate, etc., for the 17-acetate employed as starting material in the preceding paragraph, yields the corresponding 17β - hydroxy - 7 - methylene-3α,5α-cycloandrostan-6-one 17-acylate (V).

PREPARATION 47

*17β-hydroxy - 7 - methylene-19-nor-3α,5α-cycloandrostan-6-one (V)*

Following the procedure of Preparation 43 but substituting 17β - hydroxy-19-nor3α,5α-cycloandrostan-6-one (IV) (obtained in Preparation 35) as starting material, yields 17β - hydroxy - 7 - methylene - 19 - nor-3α,5α-cycloandrostan-6-one (V).

PREPARATION 48

*17β-hydroxy-7-methylene-3α,5α-cycloandrostan-6-one (V)*

Following the procedure of Preparation 43 but substituting 17β - hydroxy-3α,5α-cycloandrostan-6-one (IV) (obtained in Preparation 36) as starting material, yields 17β - hydroxy - 7 - methylene - 3α,5α - cycloandrostan-6-one (V).

PREPARATION 49

*17β-hydroxy - 17α - methyl - 7 - methylene-19-nor-3α,5α-cycloandrostan-6-one (V)*

Following the procedure of Preparation 43 but substituting 17β-hydroxy - 17α - methyl-19-nor-3α,5α-cycloandrostan-6-one (IV) (obtained in Preparation 15) as starting material, yields 17β-hydroxy-17α-methyl-7-methylene-19-nor-3α,5α-cycloandrostan-6-one (V).

Following the procedure of Preparation 49 but substituting other corresponding 17α-alkyl compounds (IV) as starting materials, such as (1) 17β-hydroxy-17α-ethyl-19-nor-3α,5α-cycloandrostan-6-one (IV)
(2) 17β-hydroxy-17α-undecyl-19-nor-3α,5α-cycloandrostan-6-one (IV), etc., yields, respectively, (1) 17β-hydroxy-17α-ethyl-7-methylene-19-nor-3α,5α-cycloandrostan-6-one (V)
(2) 17β-hydroxy-17α-undecyl-7-methylene-19-nor-3α,5α-cycloandrostan-17α-undecyl-6-one (IV), etc.

PREPARATION 50

*17β - hydroxy-17α-methyl-7-methylene-3α,5α-cycloandrostan-17α-methyl-6-one (V)*

Following the procedure of Preparation 43 but substituting 17β - hydroxy-17α-methyl-3α,5α-cycloandrostan-6-one (IV) (obtained in Preparation 16) as starting material, yields 17β-hydroxy-17α-methyl-7-methylene-3α,5α-cycloandrostan-6-one (V).

Following the procedure of Preparation 50 but substituting other corresponding 17α-alkyl compounds (IV) as starting materials, such as (1) 17β-hydroxy-17α-isopropyl-3α,5α-cycloandrostan-6-one (IV),
(2) 17β-hydroxy-17α-dodecyl-3α,5α-cycloandrostan-6-one (IV), etc., yields, respectively, (1) 17β-hydroxy-17α-isopropyl-7-methylene-3α,5α-cycloandrostan-6-one (V),
(2) 17β-hydroxy-17α-dodecyl-7-methylene-3α,5α-cycloandrostan-6-one (V), etc.

PREPARATION 51

*17β - hydroxy - 17α - methyl-7-methylene-19-nor-3α,5α-cycloandrostan-6-one 17-acetate (V)*

Following the procedure of Preparation 43 but substituting 17β-hydroxy-17α-methyl - 19 - nor-3α,5α-cycloandrostan-6-one 17-acetate (IV) (obtained in Preparation 37) as starting material, yields 17β-hydroxy-17α-methyl - 7 - methylene-19-nor-3α,5α-cycloandrostan-6-one (V).

Substituting other 17 - acylates of 17β-hydroxy-17α-methyl-3α,5α-cycloandrostan-6-one (IV), such as the 17-butyrate, 17-valerate, 17-decanoate, 17-propiolate, etc. for the 17-acetate compound employed as starting material in the preceding paragraph, yields the corresponding 17β - hydroxy-17α-methyl-7-methylene-19-nor-3α,5α-cycloandrostan-6-one 17-acylate (V).

Following the procedures of the immediately preceding paragraph and of Preparation 51 but substituting other representative corresponding 17α-alkyl 17-acylates (IV) such as, (1) 17β-hydroxy-17α-hexyl-19-nor-3α,5α-cycloandrostan-6-one 17-valerate (IV),
(2) 17β-hydroxy-17α-decyl-19-nor-3α,5α-cycloandrostan-6-one 17-benzoate (IV),
(3) 17β-hydroxy-17α-ethyl-19-nor-3α,5α-cycloandrostan-6-one 17-cyclopentylpropionate (IV), etc., yields, respectively, (1) 17β-hydroxy-17α-hexyl-7-methylene-19-nor-3α,5α-cycloandrostan-6-one 17-valerate (V),
(2) 17β-hydroxy-17α-decyl-7-methylene-19-nor-3α,5α-cycloandrostan-6-one 17-benzoate (V),
(3) 17β-hydroxy-17α-ethyl-7-methylene-19-nor-3α,5α-cycloandrostan-6-one 17-cyclopentylpropionate (V).

PREPARATION 52

*17β - hydroxy-17α-methyl-7-methylene-3α,5α-cycloandrostan-6-one 17-acetate (V)*

Following the procedure of Preparation 43 but substituting 17β - hydroxy-17α-methyl-3α,5α-cycloandrostan- 6-one 17-acetate (IV) (obtained in Preparation 38) as starting material, yields 17β-hydroxy - 17α - methyl-7-methylene-3α,5α-cycloandrostan-6-one 17-acetate (V).

Substituting other 17-acylates of 17β - hydroxy - 17α-methyl - 3α,5α-cycloandrostan - 6 - one (IV), such as the 17-isobutyrate, 17-hexanoate, 17-cyclopentylpropionate, 17-isovalerate, etc. for the 17-acetate employed as starting material in the preceding paragraph, yields the corresponding 17β-hydroxy - 17α - methyl-7-methylene-3α,5α-cycloandrostan-6-one 17-acylate (V).

Following the procedures of the immediately preceding paragraph and of Preparation 52 but substituting other representative corresponding 17α-alkyl 17-acylates (IV), such as (1) 17β-hydroxy-17α-isobutyl-3α,5α-cycloandrostan-6-one 17-benzoate (IV),
(2) 17β-hydroxy-17α-octyl-3α,5α-cycloandrostan-6-one 17-isovalerate (IV),
(3) 17β-hydroxy-17α-dodecyl-3α,5α-cycloandrostan-6-one 17-cyclopentylpropionate (IV), etc., yields, respectively, (1) 17β-hydroxy-17α-isobutyl-7-methylene-3α,5α-cycloandrostan-6-one 17-benzoate (V),
(2) 17β-hydroxy-17α-octyl-7-methylene-3α,5α-cycloandrostan-6-one 17-isovalerate (V),
(3) 17β-hydroxy-17α-dodecyl-7-methylene-3α,5α-cycloandrostan-6-one 17-cyclopentylpropionate (V), etc.

PREPARATION 53

*17β-hydroxy-17α-ethynyl-7-methylene-19-nor-3α,5α-cycloandrostan-6-one (V)*

Following the procedure of Preparation 43 but substituting 17β-hydroxy - 17α - ethynyl - 19 - nor-3α,5α-cycloandrostan-6-one (IV) (obtained in Preparation 17) as starting material, yields 17β-hydroxy - 17α - ethynyl-7-methylene-19-nor-3α,5α-cycloandrostan-6-one (V).

Following the procedure of Preparation 53 but substituting other corresponding 17α - alkynyl compounds (IV) as starting materials, such as (1) 17β-hydroxy-17α(1-butynyl)-19-nor-3α,5α-cycloandrostan-6-one (IV),
(2) 17β-hydroxy-17α-trifluoromethylethynyl-19-nor-3α,5α-cycloandrostan-6-one (IV), etc., yields, respectively, (1) 17β-hydroxy-17α(1-butynyl)-7-methylene-19-nor-3α,5α-cycloandrostan-6-one (V),
(2) 17β-hydroxy-17α-trifluoromethylethynyl-7-methylene-19-nor-3α,5α-cycloandrostan-6-one (V), etc.

PREPARATION 54

*17β-hydroxy-17α-ethynyl-7-methylene-3α,5α-cycloandrostan-6-one (V)*

Following the procedure of Preparation 43 but substituting 17β - hydroxy-17α-ethynyl - 3α,5α - cycloandrostan-6-one (IV) (obtained in Preparation 18) as starting material, yields 17β-hydroxy - 17α - ethynyl - 7 - methylene-3α,5α-cycloandrostan-6-one (V).

Following the procedure of Preparation 54 but substituting other corresponding 17α - alkynyl compounds (IV) as starting materials, such as (1) 17β-hydroxy-17α(1-propynyl)-3α,5α-cycloandrostan-6-one (IV),
(2) 17β-hydroxy-17α-chloroethynyl-3α,5α-cycloandrostan-6-one (IV), etc., yields, respectively, (1) 17β-hydroxy-17α(1-propynyl)-7-methylene-3α,5α-cycloandrostan-6-one (V),
(2) 17β-hydroxy-17α-chloroethynyl-7-methylene-3α,5α-cycloandrostan-6-one (V), etc.

PREPARATION 55

*17β-hydroxy-17α-ethynyl-7-methylene-19-nor-3α,5α-cycloandrostan-6-one 17-acetate (V)*

Following the procedure of Preparation 43 but substituting 17β-hydroxy - 17α - ethynyl-19-nor-3α,5α-cycloandrostan-6-one 17-acetate (IV) (obtained in Preparation 39) as starting material, yields 17β-hydroxy-17α-ethynyl-7 - methylene-19-nor - 3α,5α - cycloandrostan-6-one 17-acetate (V).

Substituting other 17-acylates of 17β - hydroxy-17α-ethynyl - 19 - nor - 3α,5α - cycloandrostan - 6 - one (IV), such as the 17-propionate, 17 - undecanoate, 17-phenylacetate, 17 - hexanoate, 17 - phenyloctanoate, etc., for the 17-acetate compound employed as starting material in the preceding paragraph, yields the corresponding 17β-hydroxy - 17α - ethynyl - 7 - methylene-19-nor-3α,5α-cycloandrostan-6-one 17-acylate (V).

Following the procedure of Preparation 55 but substituting other corresponding 17α-alkynyl 17-acylate compounds (IV) as starting materials, such as (1) 17β-hydroxy-17α(1-propynyl)-19-nor-3α,5α-cycloandrostan-6-one 17-acetate (IV),
(2) 17β-hydroxy-17α-trifluoromethylethynyl-19-nor-3α,5α-cycloandrostan-6-one 17-propionate (IV), etc., yields, respectively, (1) 17β-hydroxy-17α(1-propynyl)-7-methylene-19-nor-3α,5α-cycloandrostan-6-one 17-acetate (V),
(2) 17β-hydroxy-17α-trifluoromethylethynyl-7-methylene-19-nor-3α,5α-cycloandrostan-17α-trifluoromethylethynyl-6-one 17-propionate (V), etc.

PREPARATION 56

*17β-hydroxy-17α-ethynyl-7-methylene-3α,5α-cycloandrostan-6-one 17-acetate (V)*

Following the procedure of Preparation 43 but substituting 17β - hydroxy - 17α - ethynyl - 3α,5α - cycloandrostan-6-one 17-acetate (IV) (obtained in Preparation 40) as starting material, yields 17β-hydroxy-17α-ethynyl-7-methylene-3α,5α-cycloandrostan-6-one 17-acetate (V).

Substituting other 17-acylates of 17β - hydroxy-17α-ethynyl - 3α,5α - cycloandrostan-6-one (IV), such as the 17-butyrate, 17-octanoate, 17-phenylacetate, 17-valerate, etc. for the 17-acetate employed as starting material in the preceding paragraph, yields the corresponding 17β-hydroxy - 17α - ethynyl - 7 - methylene - 3α,5α - cycloandrostan-6-one 17-acylate (V).

Following the procedure of the immediately preceding paragraph and of Preparation 56 but substituting other representative corresponding 17α - alkynyl 17 - acylates (IV), such (1) 17β-hydroxy-17α(2-butynyl)-3α,5α-cycloandrostan-6-one 17-isobutyrate (IV),
(2) 17β-hydroxy-17α-chloroethynyl-3α,5α-cycloandrostan-6-one 17-valerate (IV), etc., yields, respectively, (1) 17β-hydroxy-17α(2-butynyl)-7-methylene-3α,5α-cycloandrostan-6-one 17-isobutyrate (V),
(2) 17β-hydroxy-17α-chloroethynyl-7-methylene-3α,5α-cycloandrostan-6-one 17-valerate (V), etc.

PREPARATION 57

*17β-hydroxy-17α-vinyl-7-methylene-19-nor-3α,5α-cycloandrostan-6-one (V)*

Following the procedure of Preparation 43 but substituting 17β - hydroxy - 17α - vinyl - 19 - nor - 3α,5α-cycloandrostan-6-one (IV) (obtained in Preparation 19) as starting material, yields 17β - hydroxy - 17α - vinyl-7-methylene-19-nor-3α,5α-cycloandrostan-6-one (V).

Following the procedure of Preparation 57 but substituting other corresponding 17α-alkenyl compounds (IV) as starting materials, such as (1) 17β-hydroxy-17α(3-pentenyl)-19-nor-3α,5α-cycloandrostan-6-one (IV),
(2) 17β-hydroxy-17α(4-nonenyl)-19-nor-3α,5α-cycloandrostan-6-one (IV),
(3) 17β-hydroxy-17α-trifluoromethylvinyl-19-nor-3α,5α-cycloandrostan-6-one (IV),
(4) 17β-hydroxy-17α(1-propenyl)-19-nor-3α,5α-cycloandrostan-6-one (IV),
(5) 17β-hydroxy-17α(2-butenyl)-19-nor3α,5α-cycloandrostan-6-one (IV), etc., yields, respectively, (1) 17β-hydroxy-17α(3-pentenyl)-7-methylene-9-nor-3α,5α-cycloandrostan-6-one (V),
(2) 17β-hydroxy-17α(4-nonenyl)-7-methylene-19-nor-3α,5α-cycloandrostan-6-one (V),
(3) 17β-hydroxy-17α-trifluoromethylvinyl-7-methylene-19-nor-3α,5α-cycloandrostan-6-one (V),
(4) 17β-hydroxy-17α(1-propenyl)-7-methylene-19-nor-3α,5α-cycloandrostan-6-one (V),
(5) 17β-hydroxy-17α(2-butenyl)-7-methylene-19-nor-3α,5α-cycloandrostan-6-one (V), etc.

PREPARATION 58

*17β-hydroxy-17α-vinyl-7-methylene-3a,5a-cycloandrostan-6-one (V)*

Following the procedure of Preparation 43 but substituting 17β - hydroxy-17α-vinyl-3α,5α-cycloandrostan-6-one (IV), (obtained in Preparation 30) as starting material, yields 17β-hydroxy-17α-vinyl-7-methylene-3α,5α-cycloandrostan-6-one (V).

Following the procedure of Preparation 58 but substituting other corresponding 17α-alkenyl compounds (IV) as starting materials, such as (1) 17β-hydroxy-17α(1-propenyl)-3α,5α-cycloandrostan-6-one (IV),
(2) 17β-hydroxy-17α-chlorovinyl-3α,5α-cycloandrostan-6-one, etc., yields, respectively, (1) 17β-hydroxy-17α(1-propenyl)-7-methylene-3α,5α-cycloandrostan-6-one (V),
(2) 17β-hydroxy-17α-chlorovinyl-7-methylene-3α,5α-cycloandrostan-6-one (V), etc.

PREPARATION 59

*17β-hydroxy-17a-vinyl-7-methylene-19-nor-3a,5a-cycloandrostan-6-one 17-acetate (V)*

Following the procedure of Preparation 43 but substituting 17β - hydroxy - 17α - vinyl-19-nor-3α,5α-cycloandrostan-6-one 17-acetate (IV) (obtained in Preparation 41) as starting material, yields 17β-hydroxy-17α-vinyl-7-methylene-19-nor-3α,5α-cycloandrostan-6-one 17-acetate (V).

Substituting other 17-acylates of 17β-hydroxy-17α-vinyl-19-nor-3α,5α-cycloandrostan-6-one (IV), such as the 17-propionate, 17-hexanoate, 17-decanoate, 17-phenylacetate, etc., for the 17-acetate compound employed as starting material in the preceding paraghaph, yields the corresponding 17β - hydroxy-17α-vinyl-7-methylene-19-nor-3α, 5α-cycloandrostan-6-one 17-acylate (V).

Following the procedures of the immediately preceding paragraph and of Preparation 59 but substituting other representative corresponding 17α-alkenyl 17-acylates (IV), such as (1) 17β-hydroxy-17α(2-butenyl)-19-nor-3α,5α-cycloandrostan-6-one 17-isobutyrate (IV),
(2) 17β-hydroxy-17α(4-hexenyl)-19-nor-3α,5α-cycloandrostan-6-one 17-phenylpropionate (IV), etc., yields, respectively, (1) 17β-hydroxy-17α(2-butenyl)-7-methylene-19-nor-3α,5α-cycloandrostan-6-one 17-isobutyrate (V),
(2) 17β-hydroxy-17α(4-hexenyl)-7-methylene-19-nor-3α,5α-cycloandrostan-6-one 17-phenylpropionate (IV), etc.

PREPARATION 60

*17β-hydroxy-17α-vinyl-7-methylene-3α,5α-cycloandrostan-6-one 17-acetate (V)*

Following the procedure of Preparation 43 but substituting 17β - hydroxy - 17α - vinyl-19-nor-3α,5α-cycloandrostan-6-one 17-acetate (IV) (obtained in Preparation 41) as starting material, yields 17β-hydroxy-17α-vinyl - 7-mehylene-3α,5α-cycloandrostan-6-one 17-acetate (V).

Substituting other 17-acylates of 17β-hydroxy-17α-vinyl-3α,5α-cycloandrostan-6-one (V), such as the 17-propionate, 17-isobutyrate, 17-hexanoate, 17-phenylpropionate, etc., for the 17-acetate employed as starting material in the preceding paragraph, yields the corresponding 17β-hydroxy - 17α - vinyl-7-methylene-3α,5α-cycloandrostan-6-one 17-acylate (V).

Following the procedures of the immediately preceding paragraph and of Preparation 60 but substituting other representative corresponding 17α-alkenyl 17-acylates (IV), such as (1) 17β-hydroxy-17α(2-propenyl)-3α,5α-cycloandrostan-6-one 17-valerate (IV),
(2) 17β-hydroxy-17α(3-hexenyl)-3α,5α-cycloandrostan-6-one 17-trimethylacetate (IV), etc., yields, respectively, (1) 17β-hydroxy-17α(2-propenyl)-7-methylene-3α,5α-cycloandrostan-6-one 17-valerate (V),
(2) 17β-hydroxy-17α(3-hexenyl)-7-methylene-3α,5α-cycloandrostan-6-one 17-trimethylacetate (V), etc.

EXAMPLE 1

*Spiro[6,17-dioxo-3α,5α-cycloandrostane-7,3'[1]pyrazoline]-(VI)*

To a mixture of 15 ml. of 45% aqueous potassium hydroxide and 100 ml. of ether cooled in an ice bath, 4 g. of N-methyl-N-nitroso-N'-nitroguanidine (J. Amer. Chem. Soc. 69, 3–18) is added slowly in small portions. The thus produced diazomethane contained in the ether phase is decanted. To the diazomethane solution, 2 g. of 7-methylene-3α,5α-cycloandrostane-6,17-dione (V) (prepared as in Preparation 44) is added. After standing at room temperature for about 16 hours the solution is evaporated to dryness and the residue recrystallized from a mixture of acetone and Skellysolve B (hexanes) to give 1.85 g. of spiro[6,17-dioxo-3α,5α-cycloandrostane-7,3' [1]pyrazoline](VI) melting at 145 to 150° C. with bubbling) and having a rotation (α) of −354° (chloroform). Its infrared absorption spectrum shows 17—C=O and 6—C=O bands at 1740 and 1680 cm.$^{-1}$, respectively. The nuclear magnetic resonance (NMR) spectrum (CDCl$_3$) of the compound (VI) shows: δ .92 (C–18), 1.15δ (C–19), 4.2δ to 5.1δ (multiplet pyrazoline CH$_2$.

*Analysis.*—Calcd. for C$_{21}$H$_{18}$O$_2$N$_2$ (percent): N, 8.23. Found (percent): N, 8.52.

Following the procedure of Example 1 but substituting other representative 7-methylene compounds (V) (obtained in Preparation 43 through 60) as starting materials, such as (1) 7-methylene-19-nor-3α,5α-cycloandrostane-6,17-dione (V),
(2) 17β-hydroxy-7-methylene-19-nor-3α,5α-cycloandrostan-6-one 17-acetate (V),
(3) 17β-hydroxy-7-methylene-3α,5α-cycloandrostan-6-one (V),
(4) 17β-hydroxy-7-methylene-3α,5α-cycloandrostan-6-one 17-butyrate (V),
(5) 17β-hydroxy-17α-methyl-7-methylene-19-nor-3α,5α-cycloandrostan-6-one (V),
(6) 17β-hydroxy-17α-isopropyl-7-methylene-3α,5α- cycloandrostan-6-one 17-valerate (V),
(7) 17β-hydroxy-17α-ethynyl-7-methylene-19-nor-3α,5α-cycloandrostan-6-one (V),
(8) 17β-hydroxy-17α-trifluoromethylethynyl-7-methylene-3α,5α-cycloandrostan-6-one (V),
(9) 17β-hydroxy-17α(2-butynyl)-7-methylene-19-nor-3α,5α-cycloandrostan-6-one 17-phenylacetate (V),
(10) 17β-hydroxy-17α(1-propynyl)-7-methylene-3α,5α-cycloandrostan-6-one 17-valerate (V),
(11) 17β-hydroxy-17α-vinyl-7-methylene-19-nor-3α,5α-cycloandrostan-6-one (V),
(12) 17β-hydroxy-17α(1-propenyl)-7-methylene-3α,5α-cycloandrostan-6-one (V),
(13) 17β-hydroxy-17α(2-butenyl)-7-methylene-19-nor-3α,5α-cycloandrostan-6-one 17-trimethylacetate (V),
(14) 17β-hydroxy-17α-hexenyl-7-methylene-3α,5α-cycloandrostan-6-one 17-propionate (V), etc., yields, respectively, (1) spiro[6,17-dioxo-19-nor-3α,5α-cycloandrostane-7,3'-[1]pyrazoline] (VI),
(2) spiro[17β-hydroxy-6-oxo-19-nor-3α,5α-cycloandrostane-7,3'-[1]pyrazoline] 17-acetate (VI),
(3) spiro[17β-hydroxy-6-oxo-3α,5α-cycloandrostane-7,3'-[1]pyrazoline] (VI),
(4) spiro[17β-hydroxy-6-oxo-3α,5α-cycloandrostane-7,3'-[1]pyrazoline] 17-butyrate (VI),
(5) spiro[17β-hydroxy-17α-methyl-6-oxo-19-nor-3α,5α-cycloandrostane-7,3'-[1]pyrazoline] (VI),
(6) spiro[17β-hydroxy-17α-isopropyl-6-oxo-3α,5α-cycloandrostane-7,3'-[1]pyrazoline] 17-valerate (VI),
(7) spiro[17β-hydroxy-17α-ethynyl-6-oxo-19-nor-3α,5α-cycloandrostane-7,3'-[1]pyrazoline] (VI),
(8) spiro[17β-hydroxy-17α-trifluoromethyl-ethynyl-6-oxo-3α,5α-cycloandrostane-7,3'-[1]pyrazoline] (VI),
(9) spiro[17β-hydroxy-17α(2-butynyl-6-oxo-19-nor-3α,5α-cycloandrostane-7,3'-[1]pyrazoline] 17-phenylacetate (VI),
(10) spiro[17β-hydroxy-17α(1-propynyl-6-oxo)-3α,5α-cycloandrostane-7,3'-[1]pyrazoline] 17-valerate (VI),
(11) spiro[17β-hydroxy-17α-vinyl-6-oxo-19-nor-3α,5α-cycloandrostane-7,3'-[1]pyrazoline](VI),
(12) spiro[17β-hydroxy-17α(1-propenyl)-6-oxo-3α,5α-cycloandrostane-7,3'-[1]pyrazoline] (VI),
(13) spiro[17β-hydroxy-17α(2-butenyl)-6-oxo-19-nor-3α,5α-cycloandrostane-7,3'-[1]pyrazoline] 17-trimethylacetate (VI),
(14) spiro[17β-hydroxy-17α-hexenyl-6-oxo-3α,5α-cycloandrostane-7,3'-[1]pyrazoline] 17-propionate (VI), etc.

EXAMPLE 2

*7-spirocyclopropyl-3α,5α-cycloandrostane-6,17-dione (VII)*
*7-ethylidene-3α,5α-cycloandrostane-6,17-dione (VIIa)*
*7-(2'-hydroxyethyl)-3α,5α-cycloandrostane-6,17-dione (VIIb)*

1.5 g. of spiro[6,17 - dioxo-3α,5α-cycloandrostane-7,3'-[1]pyrazoline] (VI) (obtained in Example 1) is heated in a Woods metal bath at about 150° C. under vacuum until bubbling ceases. The product is chromatographed through a silica gel (silicic acid) column. The non-polar fractions are combined and rechromatographed through a 150 g. column of Florisil (synthetic magnesium silicate) packed wet with Skellysolve B (hexanes); separation is carried out by gradient elution with 400 ml. fractions between 5 l. of Skellysolve B (hexanes) and 5 l. of a mixture containing 10% acetone and Skellysolve B (hexanes). Those fractions exhibiting u.v. absorption near 244 mμ (fractions 19 through 24) are combined and recrystallized from acetone-Skellysolve B (hexanes) to give 480 mg. of 7-ethylidene-3α,5α-cycloandrostane-6,17-dione (VIIa), having a melting point of 160 to 161° C.; λ alc. max. 244 mμ (ε=9,950); [α]$_D$+181° (chloroform); infrared spectrum having absorption maxima at 1730, 1665 and 1600 cm.$^{-1}$; nuclear magnetic resonance (NMR) spectrum (CDCl$_3$): δ0.98 (C–18), 1.02 (C–19), 1.92 (doublet of doublets J=7 c.p.s. and 1.5 c.p.s. =CH—CH$_3$), 5.82 (double quartet J=7, 0.5 c.p.s., =CH—CH$_3$). Decoupling experiments show 1.91 and 5.82 systems are coupled; mass spectrum: M/e 312, 297, 284, 279, 269.

Those fractions with IR absorption at 1735 and 1660 cm.$^{-1}$ with no OH absorption (fractions 26 through 32) are combined and recrystallized from a mixture of acetone and Skellysolve B to give 0.34 g. of 7-spirocyclopropyl - 3α,5α - cycloandrostane) - 6,17 - dione (VII), melting at 189 to 192° C.; [α]$_D$+131° (chloroform); infrared spectrum showing absorption maxima at 1735 and 1660 cm.$^{-1}$; NMR spectrum (CHCl$_3$): δ0.9 (C–18), 1.05 (C–9), small bands observed in the 0.7–0.8 region are assigned to the cyclopropyl group; mass spectrum: M/e 312, 297, 187.

The more polar crystalline fractions of the silica gel column are combined and recrystallized from acetone-Skellysolve B to give 110 mg. of 7-(2'-hydroxyethyl)-3α,5α-cycloandrostane-6,17-dione (VIIb); melting point 138 to 142° C. (with decomposition); infrared spectrum shows absorption maxima at 3460 (OH). 1735 (C=O), 1665 cm.$^{-1}$ (C=O) NMR spectrum (CDCl$_3$): δ0.92 (C–18), 1.04 (C–19), 3.3 (broad OH), 3.75 (t, J=5.5 c.p.s. =CH$_2$—OH); mass spectrum: M/e 330, 312.

Heating a mineral oil suspension of spiro (6,17-dioxo)-3α,5α-cycloandrostane - 7,3' - [1]pyrazoline] (VI) at 130 to 140° C. also gives 7-spirocyclopropyl-3α,5α-cycloandrostane-6,17-dione (VII).

Following the procedure of Example 2 but substituting other representative pyrazoline compounds (VI) as starting materials, such as (1) spiro[6,17-dioxo-19-nor-3α,5α-cycloandrostane-7,3'-[1]pyrazoline] (VI),
(2) spiro[17β-hydroxy-6-oxo-3α,5α-cycloandrostane-7,3'-[1]pyrazoline] (VI),
(3) spiro[17β-hydroxy-17α-isopropyl-6-oxo-3α,5α-cycloandrostane-7,3'-[1]pyrazoline] 17-acetate (VI),
(4) spiro[17β-hydroxy-17α-ethynyl-6-oxo-19-nor-3α,5α-cycloandrostane-7,3'-[1]pyrazoline] (VI),
(5) spiro[17β-hydroxy-17α(1-propynyl)-6-oxo-3α,5α-cycloandrostane-7,3'-[1]pyrazoline] 17-valerate (VI),
(6) spiro[17β-hydroxy-17-vinyl-6-oxo-3α,5α - cycloandrostane-7,3'-[1]pyrazoline] (VI),
(7) spiro[17β-hydroxy-17α(2-butenyl)-6-oxo-19-nor - 3α,5α - cycloandrostane-7,3'-[1]pyrazoline] (VI), etc., yields, respectively, (1) 7-spirocyclopropyl-19-nor-3α,5α-cycloandrostane - 6,17-dione (VII); 7-ethylidene-19-nor-3α,5α-cycloandrostane-6,17-dione (VIIa); 7-(2'-hydroxyethyl)-19-nor-3α,5α-cycloandrostane-6,17-dione (VIIb),
(2) 17β-hydroxy-7-spirocyclopropyl-3α,5α - cycloandrostan-6-one (VII); 17β-hydroxy-7-ethylidene-3α,5α-cycloandrostan-6-one (VIIa); 17β-hydroxy-7-(2'-hydroxyethyl)-3α,5α-cycloandrostan-6-one (VIIb),
(3) 17β-hydroxy-17α-isopropyl-7-spirocyclopropyl-3α,5α-cycloandrostan-6-one 17-acetate (VII); 17β-hydroxy-17α - isopropyl - 7 - ethylidene-3α,5α-cycloandrostan-6-one 17-acetate (VIIa); 17β-hydroxy-17α-isopropyl-7-(2'-hydroxyethyl)-3α,5α-cycloandrostan-6-one 17-acetate (VIIb),
(4) 17β-hydroxy-17α-ethynyl-7-spirocyclopropyl-19 - nor-3α,5α-cycloandrostan-6-one (VII); 17β-hydroxy-17α- ethynyl - 7 - ethylidene-19-nor-3α,5α-cycloandrostan-6-one (VIIa); 17β-hydroxy-17α-ethynyl-7-(2'-hydroxyethyl)-19-nor-3α,5α-cycloandrostan-6-one (VIIb), (5) 17β-hydroxy-17α(1-propynyl)-7-spirocyclopropyl-3α,5α-cycloandrostan-6-one 17-valerate (VII); 17β-hydroxy - 17α(1 - propynyl)-7-ethylidene-3α,5α-cycloandrostan-6-one 17-valerate (VIIa); 17β-hydroxy-17α(1-propynyl) - 7-(2'-hydroxyethyl)-3α,5α-cycloandrostan-6-one 17-valerate (VIIb), (6) 17β-hydroxy-17α-vinyl-7-spirocyclopropyl-3α,5α - cycloandrostan - 6 - one (VII); 17β-hydroxy-17-vinyl-7-ethylidene-3α,5α-cycloandrostan-6-one (VIIa); 17β-hydroxy - 17α - vinyl-7-(2'-hydroxyethyl)-3α,5α-cycloandrostan-6-one (VIIb), (7) 17β-hydroxy-17α(2-butenyl)-7-spirocyclopropyl - 19-nor-3α,5α-cycloandrostan-6-one (VII); 17β-hydroxy-17α(2 - butenyl)-7-ethylidene-19-nor-3α,5α-cycloandrostan-6-one (VIIa); 17β-hydroxy-17α(2-butenyl)-7-(2'-hydroxyethyl) - 9 - nor - 3α,5α - cycloandrostan-6-one (VIIb), etc.

EXAMPLE 3

*7-spirocyclopropyl-3α,5α-cycloandrostane-6α,17β-diol (VII)*

To a solution of 0.27 g. of 7-spirocyclopropyl-3α,5α-cycloandrostane-6,17-dione (VII) (obtained in Example 2) in 10 ml. of methanol, an excess (0.1 g.) of sodium borohydride is added while cooling the reaction mixture in an ice bath. Crystals form as the solution cools. After the crystals dissolve, water is added and the precipitated product is collected. The product is recrystallized twice from acetone-Skellysolve B to give 7-spirocyclopropyl-3α,5α-cycloandrostane-6α,17β-diol (VIII) with a melting point of 170 to 172° C.; [α]$_d$+40° (dioxane); infrared spectrum having absorption maxima at 3450, 3410 cm.$^{-1}$.

Analysis.—Calcd. for $C_{21}H_{32}O_2$ (percent): C, 79.70; H, 10.19. Found (percent): C, 79.25; H, 9.90.

Following the procedure of Example 3 but substituting other representative 6-keto compounds (VII) as starting materials, such as (1) 7-spirocyclopropyl-19-nor-3α,5α-cycloandrostane - 6,17-dione (VII),
(2) 17β-hydroxy-7-spirocyclopropyl-3α,5α - cycloandrostan-6-one (VII),
(3) 17β-hydroxy-17α-methyl-7-spirocyclopropyl-19 - nor-3α,5α-cycloandrostan-6-one 17-propionate (VII),
(4) 17α-ethynyl-7-spirocyclopropyl - 3α,5α - cycloandrocyclopropyl - 3α,5α - cycloandrostan-6-one (VII),
(5) 17β-hydroxy-17α(1-butynyl)-7-spirocyclopropyl - 19-nor - 3α,5α - cycloandrostan-6-one 17-trimethylacetate VII),
(6) 17β-hydroxy-17α(1-propenyl)-7-spirocyclopropyl - 3α,5α-cycloandrostan-6-one (VII),
(7) 17β-hydroxy-17α(1-butenyl)-7-cyclopropyl-19 - nor-3α,5α-cycloandrostan-6-one 17-isobutyrate (VII), etc., yields, respectively, (1) 7-spirocyclopropyl-19-nor - 3α,5α - cycloandrostane-6α,17β-diol (VIII),
(2) 7-spirocyclopropyl-3α,5α - cycloandrostane - 6α,17β-diol (VIII),
(3) 17α-methyl-7-spirocyclopropyl-19-nor - 3α,5α - cycloandrostane-6α,17β-diol 17-propionate (VIII),
(4) 17α-ethynyl-7-spirocyclopropyl - 3α,5α - cycloandrostane-6α,17β-diol (VIII),
(5) 17α(2-butynyl)-7-spirocyclopropyl-19-nor-3α,5α - cycloandrostane-6α,17β-diol 17-trimethylacetate (VIII),
(6) 17α(1-propenyl)-7-spirocyclopropyl-3α,5α - cycloandrostane-6α,17β-diol (VIII),
(7) 17α(1-butenyl)-7-spirocyclopropyl-19-nor-3α,5α - cycloandrostane-6α,17β-diol 17-isobutyrate (VIII), etc.

EXAMPLE 4

*17β-hydroxy-7-spirocyclopropyl-3α,5α-cycloandrostan-6-one (VII)*

To a solution of 1 g. of lithium aluminum tri-t-butoxyhydride in 15 ml. of tetrahydrofuran, 1 g. of 7-spirocyclopropyl-3α,5α-cycloandrostane-6,17-dione (VII) (obtained in Example 2) is added with stirring at 0° C. The suspension is allowed to warm to room temperature during about 30 minutes, then dilute hydrochloric acid is added dropwise until all of the excess hydride is consumed. The solution is diluted with 15 ml. of water and the tetrahydrofuran removed under reduced pressure. The product is extracted into ether and the combined extracts washed successively with water, saturated aqueous sodium chloride solution, dried with sodium sulfate and the solution evaporated to dryness under reduced pressure. The residue is recrystallized twice from a mixture of acetone and Skellysolve B to yield 17β-hydroxy-7-spirocyclopropyl-3α,5α-cycloandrostane-6-one (VII).

Following the procedure of Example 4 but substituting 7 - spirocyclopropyl - 19-nor-3α,5α-cycloandrostane-6,17-dione (VII) as starting material, yields 17β-hydroxy-7-spirocyclopropyl - 19 - nor - 3α,5α-cycloandrostan-6-one (VII).

EXAMPLE 5

*17β-hydroxy-7-spirocyclopropyl-3α,5α-cycloandrostane-6-one (VII)*

A solution of 28.6 mg. of 7-spirocyclopropyl-3α,5α-cycloandrostane-6,17-dione (VII) and 1.3 mg. of sodium borohydride in 10 ml. of absolute ethanol is kept at room temperature for about 6 hours. Water is added to precipitate the product. The cottony crystals are collected and washed with water to give 17β-hydroxy-7-spirocyclopropyl-3α,5α-cycloandrostan-6-one (VII) having a melting point of 181 to 184° C. Its structure is confirmed by its infrared spectrum which shows absorption bands at 3250 cm.$^{-1}$ (OH) and 1670 cm.$^{-1}$ (N—C=O).

Following the procedure of Example 5 but substituting 7 - spirocyclopropyl-19-nod-3α,5α-cycloandrostane-6,17-dione (VII) as starting material, yields 17β-hydroxy-7-spirocyclopropyl - 19 - nor - 3α,5α-cycloandrostan-6-one (VII).

EXAMPLE 6

*7-spirocyclopropyl-3α,5α-cycloandrostane-6α,17β-diol 6,17-diacetate (VIII)*

A solution of 50 mg. of 7-spirocyclopropyl-3α,5α-cycloandrostane-6α,17β-diol (VIII) (obtained in Example 3) in 10 drops of pyridine and 10 drops of acetic anhydride is kept at room temperature for about 20 hours. Water is added and the crude product extracted with ether, washed first with dilute hydrochloric acid and then sodium carbonate solution, dried with magnesium sulfate and evaporated to dryness to yield 7-spirocyclopropyl - 3α,5α-cycloandrostane-6α,17β-diol 6,17-diacetate (VIII). The product resists crystallization. Its thin layer chromatographic analysis shows only one spot and its infrared spectrum shows C=O absorption at 1740 cm.$^{-1}$ and C—O at 1240 cm.$^{-1}$.

NMR (CDl$_3$): δ 0.20 (m-cyclopropyl-H), 0.82 (S,C–18), 1.07 (S,C–19), 1.92 (S,CH$_3$–CO), 2.01 (S,CH$_3$), 4.53 (t,17α–H), 5.42 (S,6β–H).

Similarly, by reacting 7-spirocyclopropyl-3α,5α-cycloandrostane-6α,17β-diol (VIII) with the appropriate hydrocarbon carboxylic acid anhydride (instead of acetic anhydride) and using the procedure of Example 6, there are produced other 6,17-diacylates thereof, such as the 6,17-dipropionate, 6,17-dibutyrate, 6,17-divalerate, 6,17-dihexanoate, 6,17-ditrimethylacetate, 6,17-diisobutyrate, 6,17-diphenylpropionate, 6,17-diacrylate, 6,17-dicinnamate, 6,17-diundecylenate, 6,17-dipropiolate, etc.

Following the procedures of the immediately preceding paragraph and of Example 6 but substituting other representative 6α,17β-diols (VIII) as starting materials and appropriate hydrocarbon carboxylic acid anhydrides, such as (1) 7-spirocyclopropyl-19-nor-3α,5α-cycloandrostane-6α,17β-diol (VIII) and butyric anhydride,
(2) 17α-ethyl-7-spirocyclopropyl-3α,5α-cyclodrostane-6α,-17β-diol (VIII) and phenylpropionic anhydride,
(3) 17α(2-propnyl)-7-spirocyclopropyl-19-nor-3α,5α-cycloandrostane-6α,17β-diol (VIII), and cinnamic anhydride,
(4) 17α-vinyl-7-spirocyclopropyl-19-nor-3α,5α-cycloandrostane-6α,17β-diol (VIII) and acrylic anhydride, etc., yield, respectively, (1) 7-spirocyclopropyl-19-nor-3α,5α-cycloandrostane-6α,17β-diol 6,17-dibutyrate (VIII),
(2) 17α-ethyl-7-spirocyclopropyl-3α,5α-cyclodrostane-6α,17β-diol 6,17-diphenylpropionate (VIII),
(3) 17α(2-propenyl)-7-spirocyclopropyl-19-nor-3α,5α-cycloandrostane-6α,17β-diol 6,17-dicinnamate (VIII),
(4) 17α-vinyl-7-spirocyclopropyl-3α,5α-cycloandrostane-6α,17β-diol 6,17-diacrylate (VIII), etc.

EXAMPLE 7

*7-spirocyclopropyl-3α,5α-cycloandrostane-6α,17β-diol 17-acetate (VIII)*

Following the procedure of Example 3 but substituting 17β - hydroxy-7-spirocyclopropyl-3α,5α-androstan-6-one 17-acetate (VII) as starting material, yields 7-spirocyclopropyl-3α, 5α - cycloandrostane - 6α,17β-diol 17-acetate (VIII).

Following the procedure of Example 7 but substituting other representative 6-keto compounds (VII) as starting materials, such as (1) 17β-hydroxy-17α-propyl-7-spirocyclopropyl-19-nor-3α,5α-cycloandrostan-6-one 17-propionate (VII),
(2) 17β-hydroxy-17α-ethynyl-7-spirocyclopropyl-3α,5α-cycloandrostane-6-one 17-trimethylacetate (VII),
(3) 17β-hydroxy-17α(2-pentenyl)-7-spirocyclopropyl-19-nor-3α,5α-cycloandrostan-6-one 17-isovalerate (VII), etc., yields, respectively, (1) 17α-propyl-7-spirocyclopropyl-19-nor-3α,5α-cycloandrostane-6α,17β-diol 17-propionate (VIII),
(2) 17α-ethynyl-7-spirocyclopropyl-3α,5α-cycloandrostane16α,17β-diol 17-trimethylacetate (VIII),
(3) 17α(2-pentenyl)-7-spirocyclopropyl-19-nor-3α,5α-cycloandrostane-6α,17β-diol 17-isovalerate (VIII), etc.

EXAMPLE 8

*7-spirocyclopropyl-3α,5α-cycloandrostane-6,17-dione-17-ketal*

A solution of 0.5 g. of 7-spirocyclopropyl-3α,5α-cycloandrostane-17-dione (VIII) (obtained in Example 2) in 8 ml. of 2-methyl-2-ethyl-1,3-dioxolane (redistilled through a small Vigreux column) is distilled slowly with 10 mg. of p-touenesulfonic acid for about 5 hours. Isolation with benzene and crystallization from ether-pentane yields 7 - spirocyclopropyl - 3α,5α-cycloandrostane-6,17-dione 17-ketal.

Following the procedure of Example 8 but employing 7 - spirocyclopropyl-19-nor-3α,5α - cycloandrostane-6,17-dione (VII) as starting material, yields 7-spirocyclopropyl-19-nor-3α,5α-cycloandrostane-6,17-dione 17-ketal.

EXAMPLE 9

*3α,5α-cyclospiro[androstane-7,1'-cyclopropane]-6α-ol-17-one 17-ketal*

To a solution of 0.25 g. of 7-spirocyclopropyl-3α,5α-cycloandrostane-6,17-dione 17-ketal in 10 ml. of methanol, 0.10 g. of sodium borohydride is added at room temperature. After 1 hour, water is added and the precipitated product is collected. The product is recrystallized from acetone and Skellysolve B to give 6α-hydroxy-7-spirocyclopropyl-3α,5α-cycloandrostan-17-one 17-ketal.

Following the procedure of Example 9 but substituting 7 - spirocyclopropyl - 19-nor-3α,5α-cycloandrostane-6,17-dione 17-ketal as starting material, yields 6α-hydroxy-7-spirocyclopropyl-19-nor-3α,5α-cycloandrostan-17-one 17-ketal.

EXAMPLE 10

*6α-hydroxy-7-spirocyclopropyl-3α,5α-cycloandrostan 17-one (VIII)*

To a solution of 1.0 g. of 6α-hydroxy-7-spirocyclopropyl-3α,5α-cycloandrostan-17-one 17-ketal (obtained as in Example 9) in 20 ml. of acetone, 0.10 g. of p-toluenesulfonic acid is added and the reaction mixture allowed to remain at room temperature for about 10 hours. Addition of water to the reaction mixtures precipitates the crude product (VIII) which is recovered by filtration. Three recrystallizations of this material from methanol yields pure 6α-hydroxy-7-spirocyclopropyl-3α,5α-cycloandrostan-17-one (VIII).

Following the procedure of Example 10 but substituting 6α - hydroxy - 7 - spirocyclopropyl - 19-nor-3α,5α-cycloandrostan-17-one 17-ketal as starting material, yields 6α - hydroxy - 7 - spirocyclopropyl-19-nor-3α,5α-cycloandrostane-17-one (VIII).

EXAMPLE 11

*6α-hydroxy-7-spirocyclopropyl-3α,5α-cycloandrostan-17-one 6-acetate (VIII)*

A solution of 1 g. of 6α-hydroxy-7-spirocyclopropyl-3α,5α-cycloandrostan-17-one (VIII) (obtained as in Example 10) in 1 ml. of acetic anhydride and 2 ml. of pyridine is stirred for about 72 hours at room temperature. Water is then slowly added to the reaction mixture and the product extracted with methylene chloride, washed with aqueous sodium carbonate solution until nearly neutral, dried and the solvent removed under vacuum. The residue is chromatographed through a column of Florisil to give 6α-hydroxy-7-spirocyclopropyl-3α,5α-cycloandrostan-17-one 6-acetate (VIII).

Following the procedure of Example 11 but substituting 6α-hydroxy - 7-spirocyclopropyl-19-nor-3α,5α-cycloandrostan-17-one (VIII) as starting material, yields 6α-hydroxy - 7 - spirocyclopropyl-19-nor-3α,5α - cycloandrostan-17-one 6-acetate (VIII).

Similarly, reacting 6α-hydroxy-7-spirocyclopropyl-3α,5α-cycloandrostan-17-one (VIII) or its 19-nor-counterpart (VIII) with the appropriate hydrocarbon carboxylic acid anhydride (instead of acetic anhydride) and using the procedure of Example 11, there are produced other 6-acylates thereof, such as the 6-propionate, 6-hexanoate, 6-phenylpropionate, 6-decylenate, 6-propiolate, etc.

By following the procedure of the immediately preceding paragraph but substituting a hydrocarbon carboxylic acid halide for a hydrocarbon carboxylic acid anhydride, such as acetyl chloride, phenylpropionyl chloride, capryl bromide, etc., there are produced 6-acylates of 6α - hydroxy - 7 - spirocyclopropyl-3α,5α-cycloandrostan-17-one (VIII) or its 19-nor-counterpart, such as the 6-acetate, 6-phenylpropionate, 6-caprylate, etc.

EXAMPLE 12

*7-spirocyclopropyl-5-androstene-3β,17β-diol (IX)*

To a solution of 300 mg. of 7-spirocyclopropyl-3α,5α-cycloandrostane-6α,17β-diol (VIII) (obtained as in Example 3) in 2 ml. of tetrahydrofuran, 4 drops of water and 4 drops 70% perchloric acid is added with cooling in a cold water bath. After about 10 minutes the product is precipitated by adding water. The product is filtered and recrystallized twice from ethyl acetate to give 190 mg. of pure 7-spirocyclopropyl-5 - androstene - 3β,17β-diol, having a melting point of 224 to 229° C. and $[\alpha]_D$ −106° (dioxane).

NMR (dimethylsulfoxide) .20 (S,cyclopropyl H), 0.62 (S,C–18), 1.0 (S,C–19), 3.37(m,3 and 17–H), 4.41 (S,6–H).

Analysis.—Calcd. for $C_{21}H_{32}O_2$ (percent): C, 79.70; H, 10.19. Found (percent): C, 79.34; H, 10.57.

Following the procedure of Example 12 but substituting other representative compounds of Formula VIII, such as (1) 7-spirocyclopropyl-19-nor-3α,5α-cycloandrostane-6α,17β-diol (VIII),
(2) 17α-propyl-7-spirocyclopropyl-3α,5α-cycloandrostane-6α,17β-diol (VIII),
(3) 17α(1-butynyl)-7-spirocyclopropyl-19-nor-3α,5α-cycloandrostane-6α,17β-diol (VIII),
(4) 17α-bromoethynyl-7-spirocyclopropyl-3α,5α-cycloandrostane-6α,17β-diol (VIII),
(5) 17α(3-pentenyl)-7-spirocyclopropyl-19-nor-3α,5α-cycloandrostane-6α,17β-diol (VIII),
(6) 6α-hydroxy-7-spirocyclopropyl-3α,5α-cycloandrostan-17-one (VIII), etc., yields, respectively, (1) 19-nor-7-spirocyclopropyl-5-androstene-3β,17β-diol (IX),
(2) 17α-propyl-7-spirocyclopropyl-5-androstene-3β,17β-diol (IX),
(3) 17α(1-butynyl)-19-nor-7-spirocyclopropyl-5-androstene-3β,17β-diol (IX),
(4) 17α-bromoethynyl-7-spirocyclopropyl-5-androstene-3β,17β-diol (IX),
(5) 17α(3-pentenyl)-19-nor-7-spirocyclopropyl-5-androstene-3β,17β-diol (IX),
(6) 3β-hydroxy-7-spirocyclopropyl-5-androsten-17-one (IX), etc.

EXAMPLE 13

*7-spirocyclopropyl-5-androstene-3β,17β-diol 17-acetate (IX)*

To a solution of 10 mg. of 7-spirocyclopropyl-3α,5α-cycloandrostan-6α,17β-diol 6,17 - diacetate (VIII) (obtained as in Example 6) in 0.5 ml. of acetone, 0.05 ml. of 1.1 N perchloric acid is added. After about 1 hour water is added to crystallize the product. It is collected, washed with water, dried and crystallized from aqueous acetone to yield 7-spirocyclopropyl-5-androstene-3β,17β-diol 17-acetate (IX), M.P. 170 to 171° C., infrared spectrum 3800, 1720, 1250, 1270 and 1050 cm.$^{-1}$. If desired, chromatography is used for purification in addition to crystallization.

Following the procedure of Example 13 but substituting another 6,17-diacylate of a compound of Formula VIII, such as (1) 7-spirocyclopropyl-19-nor-3α,5α-cycloandrostane-6α,17β-diol 6,17-divalerate (VIII),
(2) 17α-butyl-7-spirocyclopropyl-3α,5α-cycloandrostane-6α,17β-diol 6,17-dihexanoate (VIII),
(3) 17α-butynyl-7-spirocyclopropyl-19-nor-3α,5α-cycloandrostane-6α,17β-diol 6,17-ditrimethylacetate (VIII),
(4) 17α-vinyl-7-spirocyclopropyl-3α,5α-cycloandrostane-6α,17β-diol 6,17-dipropiolate (VIII), etc., yields, respectively, (1) 7-spirocyclopropyl-19-nor-5-androstene-3β,17β-diol 17-valerate (IX),
(2) 17α-butyl-7-spirocyclopropyl-5-androstene-3β,17β-diol 17-hexanoate (IX),
(3) 17α-(1-butynyl)-7-spirocyclopropyl-19-nor-5-androstene-3β,17β-diol 17-trimethylacetate (VIII),
(4) 17α-vinyl-7-spirocyclopropyl-5-androstene-3β,17β-diol 17-propiolate (IX), etc.

EXAMPLE 14

*7-spirocyclopropyl-5-androstene-3β,17β-diol 3-p-toluenesulfonate*

A solution of 0.1 g. of 7 - spirocyclopropyl-5-androstene-3β,17β-diol (IX) (obtained in Example 12) and 0.07 g. of p-toluenesulfonyl chloride in 1 ml. of pyridine is kept at 5° C. for about 24 hours and then at room temperature for about 24 hours. Water is added to precipitate the product, which is then collected, washed with water, dried and recrystallized from a mixture of acetone and Skellysolve B to yield 7 - spirocyclopropyl-5-androstene-3β,17β-diol 3-p-toluenesulfonate.

Following the procedure of Example 14 but substituting 7 - spirocyclopropyl-19-nor-5-androstene-3β,17β-diol (IX) for 7-spirocyclopropyl-5-androstene - 3β,17β-diol (IX) yields 7-spirocyclopropyl - 19 - nor-5-androstene-3β,17β-diol 3-p-toluenesulfonate.

EXAMPLE 14A

*7-spirocyclopropyl-5-androstene-3β,17β-diol 17-acetate 3-p-toluenesulfonate*

A soution of 0.1 g. of 7-spirocyclopropyl-5-androstene-3β,17β-diol 17-acetate (IX) (obtained in Example 13) and 0.1 g. of p-toluensulfonyl chloride and 1 ml. of pyridine is kept at roo mtemperature for about 24 hours. Water is added to precipitate the product which is then collected, washed with water and dried to give 7-spirocyclopropyl-5-androstene-3β,17β-diol 17-acetate 3-p-toluenesulfonate.

Following the procedure of Example 14a but substituting other representative compounds of Formula IX, such as (1) 3β-hydroxy-7-spirocyclopropyl-5-androsten-17-one (IX),
(2) 17α-methyl-7-spirocyclopropan-19-nor-5-androstene-3β,17β-diol (IX),
(3) 17α-ethynyl-7-spirocyclopropyl-19-nor-5-androstene-3β,17β-diol 17-acetate (IX),
(4) 17α-trifluoromethylethynyl-7-spirocyclopropyl-19-nor-5-androstene-3β,17β-diol (IX),
(5) 17α(1-propenyl)-7-spirocyclopropyl-5-androstene-3β,17β-diol 17-valerate (IX), etc., yields, respectively, (1) 3β-hydroxy-7-spirocyclopropyl-5-androsten-17-one 3-p-toluenesulfonate,
(2) 17α-methyl-7-spirocyclopropyl-19-nor-5-androstene-3β,17β-diol 3-p-toluenesulfonate,
(3) 17α-ethynyl-7-spirocyclopropyl-19-nor-5-androsten-3β,17β-diol 17-acetate 3βp-toluenesulfonate,
(4) 17α-trifluoromethylethynyl-7-spirocyclopropyl-19-nor-5-androstene-3β,17β-diol 3-p-toluenesulfonate,
(5) 17α(1-propenyl)-7-spirocyclopropyl-5-androstene-3β,17β-diol 17-valerate 3-p-toluenesulfonate, etc.

EXAMPLE 15

*6β-methoxy-7-spirocyclopropyl-3α,5α-cycloandrostan-17β-ol (VIII)*

A solution of 0.1 g. of 7-spirocyclopropyl-5-androstene-3β,17β-diol 3βp-toluenesulfonate (obtained as in Example 14), 0.3 g. of potassium acetate and 10 ml. of methanol is heated at reflux temperature for about 6 hours, then 10 ml. of water is added and the methanol evaporated under a stream of nitrogen. The reaction mixture is extracted with methylene chloride and the extract washed with saturated aqueous sodium chloride, dried over sodium sulfate, and evaporated to dryness. The residue is chromatographed over silica gel to give 6β-methoxy-7-spirocyclopropyl-3α,5α-cycloandrostan-17β-ol (VIII).

Following the procedure of Example 15 but substituting for 7-spirocyclopropyl-5-androstene-3β,17β-diol 3-p-toluenesulfonate and methanol, other starting materials and other alkanols, such as (1) 3β-hydroxy-7-spirocyclopropyl-5-androsten-17-one 3-p-toluenesulfonate and ethanol,
(2) 7-spirocyclopropyl-19-nor-5-androstene-3β,17β-diol 17-acetate 3-p-toluenesulfonate and propanol,
(3) 17α-heptyl-7-spirocyclopropyl-19-nor-5-androstene-3β,17β-diol 3-p-toluenesulfonate and isobutanol,
(4) 17α(3-butynyl)-7-spirocyclopropyl-5-androstene-3β,17β-diol 17-propionate 3-p-toluenesulfonate and pentanol,
(5) 17α-bromoethynyl-7-spirocyclopropyl-19-nor-5-androstene-3β,17β-diol 3-p-toluenesulfonate and heptanol,
(6) 17α(1-propenyl)-7-spirocyclopropyl-5-androsten-3β,17β-diol 17-isovalerate 3-p-toluenesulfonate and decanol, etc., yields, respectively, (1) 6β-ethoxy-7-spirocyclopropyl-3α,5α-cycloandrostan-17-one (VIII),
(2) 6β-propoxy-7-spirocyclopropyl-19-nor-3α,5α-cycloandrostan-17β-ol 17-acetate (VIII),
(3) 6β-isobutoxy-17α-heptyl-7-spirocyclopropyl-19-nor-3α,5α-cycloandrostan-17β-ol (VIII),
(4) 6β-pentoxy-17α(3-butynyl)-7-spirocyclopropyl-3a,5α-cycloandrostan-17β-ol 17-priopionate (VIII),
(5) 6β-heptoxy-17α-bromoethynyl-7-spirocyclopropyl-19-nor-3α,5α-cycloandrostan-17β-ol (VIII),
(6) 6β-decanoxy-17α(1-propenyl)-7-spirocyclopropyl-3α,5α-cycloandrostan-17β-ol 17-isovalerate (VIII), etc.

EXAMPLE 16

*7-spirocyclopropyl-3α,5α-cycloandrostan 6β,17β-diol (VIII)*

A solution of 0.3 g. of potassium acetate in 7 ml. of water and 7 ml. of acetone is purged with nitrogen and 0.1 g. of 7-spirocyclopropyl-5-androstene-3β,17β-diol 3-p-toluenesulfonate (obtained as in Example 14) added. The mixture is heated at reflux temperature for about 6 hours and the acetone is then evaporated with a fast stream of nitrogen. The residual product (VIII) is chromatographed through a column of silica gel (silicic acid) to give 7-spirocyclopropyl-3α,5α-cycloandrostane-6β,17β-diol (VIII).

Following the procedure of Example 16 but substituting for 7-spirocyclopropyl-5-androstene-3β,17β-diol 3-p-toluenesulfonate, other Δ[5] starting materials, such as (1) 3β-hydroxy-7-spirocyclopropyl-19-nor-5-androsten-17-one 3-p-toluenesulfonate,
(2) 7-spirocyclopropyl-19-nor-5-androstene-3β,17β-diol 17-butyrate 3-p-toluenesulfonate,
(3) 17α-methyl-7-spirocyclopropyl-5-androstene-3β,17β-diol 3-p-toluenesulfonate,
(4) 17α-ethynyl-7-spirocyclopropyl-19-nor-5-androstene-3β,17β-diol 3-p-toluenesulfonate,
(5) 17α-methyl-7-spirocyclopropyl-5-androstene-3β,17β-diol 3-p-toluenesulfonate,
(6) 17α(1-pentenyl)-7-spirocyclopropyl-19-nor-5-androstene-3β,17β-diol 17-propionate 3-p-toluenesulfonate, etc., yields, respectively, (1) 6β-hydroxy-7-spirocyclopropyl-19-nor-3α,5α-cycloandrostan-17-one (VIII),
(2) 7-spirocyclopropyl-19-nor-3α,5α-cycloandrostane-6β,17β-diol 17-butyrate (VIII),
(3) 17α-ethynyl-7-spirocyclopropyl-3α,5α-cycloandrostane-6β,17β-diol (VIII),
(4) 17α-ethynyl-7-spirocyclopropyl-19-nor-3α,5α-cycloandrostane-6β,17β-diol (VIII),
(5) 17α-methyl-7-spirocyclopropyl-3α,5α-cycloandrostane-6β,17β-diol (VIII),
(6) 17α(1-pentynyl)-7-spirocyclopropyl-19-nor-3α,5α-cycloandrostane-6β,17β-diol 17-priopinate (VIII), etc.

EXAMPLE 17

*7-spirocyclopropyl-3α,5α-cycloandrostane-6β,17β-diol 6,17-diacetate (VII)*

A solution of 250 mg. of 7-spirocyclopropyl-3α,5α-cycloandrostane-6β,17β-diol (VIII) (obtained as in Example 16) in 1 ml. of pyridine and 0.5 ml. of acetic anhydride is heated at about 80° C. for about 16 hours. Water is added to the reaction mixture and the crude product extracted with ether, the extract washed first with dilute hydrochloric acid, then sodium carbonate solution, dried with magnesium sulfate and evaporated to dryness. Chromatography of the residue through Florisil and crystallization from acetone-Skellysolve B gives 7-spirocyclopropyl-3α,5α-cycloandrostane-6β,17β-diol 6,17 - diacetate (VIII).

Similarly, by reacting 7-spirocyclopropyl-3α,5α-cycloandrostane-6β,17β-diol (VIII) with the appropriate hydrocarbon carboxylic acid anhydride (instead of acetic anhydride) and using the procedure of Example 17, there are produced other 6,17-diacylates thereof, such as the 6,17-dibutyrate, 6,17-diheptanoate, 6,17-diphenylpropionate, 6,17-dipropyiolate, etc.

Following the procedures of the immediately preceding paragraph and of Example 17 but substituting other representative 6β,17β-diols (VIII) as starting materials and appropriate hydrocarbon carboxylic acid anhydrides, such as (1) 7-spirocyclopropyl-19-nor-3α,5α-cycloandrostane-6β,17β-diol (VIII) and propionic anhydride,
(2) 17α-isobutyl-7-spirocyclopropyl-3α,5α-cycloandrostane-6β,17β-diol (VIII) and trimethylacetic anhydride,
(3) 17α-ethynyl-7-spirocyclopropyl-19-nor-3α,5α-cycloandrostane-6β,17β-diol (VIII) and phenylpropionic anhydride,
(4) 17α-methyl-7-spirocyclopropyl-3α,5α-cycloandrostane-6β,17β-diol (VIII) and isovaleric anhydride, etc., yields, respectively, (1) 7-spirocyclopropyl-19-nor-3α,5α-cycloandrostane-6β,17β-diol 6,17-dipropionate (VIII),
(2) 17α-isobutyl-7-spirocyclopropyl-3α,5α-cycloandrostane-6β,17β-diol 6,17-ditrimethylacetate (VIII),
(3) 17α-ethynyl-7-spirocyclopropyl-19-nor-3α,5α-cycloandrostane-6β,17β-diol 6,17-diphenylpropionate (VIII),
(4) 17α-methyl-7-spirocyclopropyl-3α,5α-cycloandrostane-6β,17β-diol 6,17-isovalerate (VIII), etc.

EXAMPLE 18

*7-spirocyclopropyl-3α,5α-cycloandrostane-6β,17β-diol 17-acetate (VIII)*

Following the procedure of the paragraph appearing after Example 16 but substituting 7-spirocyclopropyl-3α,5α-cycloandrostane-6β,17β-diol 17-acetate 3-p-toluenesulfonate as starting material yields 7-spirocyclopropyl-3α,5α-cycloandrostane-6β,17β-diol 17-acetate (VIII). In like manner, substituting 7-spirocyclopropyl-19-nor-3α,5α-cycloandrostane-6β,17β-diol 17-acetate 3-p-toluenesulfonate as starting material, yields 7-spirocyclopropyl-19-nor-3α,5α-cycloandrostane-6β,17β-diol 17-acetate (VIII).

EXAMPLE 19

*17β-hydroxy-7-spirocyclopropyl-4-androsten-3-one 17-acetate (X)*

A solution of 2.5 g. of 7-spirocyclopropyl-5-androstene-3β,17β-diol 17-acetate (IX) (obtained as in Example 13) in 26.65 ml. of cyclohexanone and 40 ml. of toluene is distilled to remove traces of water, then 0.83 g. of aluminum isopropoxide is added to the mixture. The reaction mixture is refluxed for about 1.75 hours, cooled and poured into iced 2 N hydrochloric acid solution. The organic phase is washed, dried and chromatographed through a column of silica gel. The product is recrystallized from acetone-Skellysolve B to give 1.39 g. of 17β-hydroxy-7-spirocyclopropyl-4-androsten-3-one 17-acetate (X) having a melting point of 125 to 127° C., [α]$_D$ +56° (chloroform), λ alc. max. 241 mμ, ε=16,900.

*Analysis.*—Calcd. for $C_{23}H_{32}O_3$ (percent): $C_1$, 77.49; $H_1$, 9.05. Found (percent): $C_1$, 77.11; $H_1$, 9.13.

Following the procedure of Example 19 but substituting other representative compounds of Formula IX, such as (1) 7-spirocyclopropyl-19-nor-5-androstene-3β,17β-diol 17-propionate (IX),
(2) 17α-methyl-7-spirocyclopropyl-5-androstene-3β,17β-diol 17-valerate (IX),
(3) 17α(1-propynyl)-7-spirocyclopropyl-19-nor-5-androstene-3β,17β-diol 17-acetate (IX),
(4) 17α(2-butenyl)-7-spirocyclopropyl-5-androstene-3β,17β-diol 17-trimethylacetate (IX),
(5) 3β-hydroxy-7-spirocyclopropyl-19-nor-5-androsten-17-one (IX), etc., yields, respectively, (1) 17β-hydroxy-7-spirocyclopropyl-19-nor-4-androsten-3-one 17-propionate (X),
(2) 17β-hydroxy-17α-methyl-7-spirocyclopropyl-4-androsten-3-one 17-propionate (X),
(3) 17β-hydroxy-17α(1-propynyl)-7-spirocyclopropyl-19-nor-4-androsten-3-one 17-acetate (X),
(4) 17β-hydroxy-17α(2-butenyl)-7-spirocyclopropyl-4-androsten-3-one 17-trimethylacetate (X),
(5) 7-spirocyclopropyl-19-nor-4-androstene-3,17-dione (X), etc.

EXAMPLE 20

*17β-hydroxy-7-spirocyclopropyl-4-androsten-3-one (X)*

A solution containing 0.6 g. of 17β-hydroxy-7-spirocyclopropyl-4-androsten-3-one 17-acetate (X) (obtained in Example 19) and 2.5 g. of potassium carbonate in 10 ml. of water and 40 ml. of methanol is heated at reflux for about 0.5 hour. The solution is cooled and the precipitated product filtered, washed with water, dried, chromatographed through a column of Florisil and the product recrystallized from acetone-Skellysolve B to yield 0.4 g. of 17β-hydroxy-7-spirocyclopropyl-4-androsten-3-one (X) melting at 198 to 199° C., λ alc. max. 241 mμ, ε=16,400. The infrared absorption and NMR spectra support the stucture proposed for the product.

*Analysis.*—Calcd. for $C_{21}H_{30}O_2$ (percent): C, 80.21; H, 9.62. Found (percent): C, 79.76; H, 9.69.

Following the procedure of Example 20 but substituting other 17-acylates of Formula IX, such as (1) 17β-hydroxy-7-spirocyclopropyl-19-nor-4-androsten-3-one 17-butyrate (X),
(2) 17β-hydroxy-17α-methyl-7-spirocyclopropyl-4-androsten-3-one 17-propiolate (X),
(3) 17β-hydroxy-17α-ethynyl-7-spirocyclopropyl-19-nor-4-androsten-3-one 17-phenylpropionate (X),
(4) 17β-hydroxy-17α-vinyl-7-spirocyclopropyl-4-androsten-3-one 17-decylenate (X), etc., yields, respectively, (1) 17β-hydroxy-7-spirocyclopropan-19-nor-4-androsten-3-one (X),
(2) 17β-hydroxy-17α-methyl-7-spirocyclopropyl-4-androsten-3-one (X),
(3) 17β-hydroxy-17α-ethynyl-7-spirocyclopropyl-19-nor-4-androsten-3-one (X),
(4) 17β-hydroxy-17α-vinyl-7-spirocyclopropyl-4-androsten-3-one (X), etc.

EXAMPLE 21

*17β-hydroxy-7-spirocyclopropyl-5β-androstan-3-one (XI)*

A solution of 1 g. of 17β-hydroxy7-spirocyclopropyl-4-androsten-3-one (X) (obtained as in Example 20) in 250 ml. of 95% ethyl alcohol is reacted with hydrogen using 5% palladium on charcoal catalyst until 1 mole quivalent of hydrogen is absorbed. The catalyst is removed by filtration through a bed of Celite (diatomaceous earth). The filtrate is concentrated to dryness, and the residue chromatographed and recrystallized from a mixture of acetone and Skellysolve B to give 17β-hydroxy-7-spirocyclopropyl-5β-androstan-ol-3-one (X).

Following the procedure of Example 21 but substituting as starting materials representative compounds of Formula X, such as (1) 17β-hydroxy-7-spirocyclopropyl-19-nor-4-androsten-3-one-17-acetate (X),
(2) 17β-hydroxy-17α-propyl-7-spirocyclopropyl-4-androsten-3-one (X),
(3) 17β-hydroxy-7-spirocyclopropyl-19-nor-4-androsten-3-one 17-propionate (X), etc.

yields, respectively, (1) 17β-hydroxy-7-spirocyclopropyl-19-nor-5β-androstan-3-one 17-acetate (XI),
(2) 17β-hydroxy-17α-propyl-7-spirocyclopropyl-5β-androstan-3-one (XI),
(3) 17β-hydroxy-7-spirocyclopropyl-19-nor-5β-androstan-3-one 17-propionate (XI), etc.

EXAMPLE 22

*17β-hydroxy-17α-ethynyl-7-spirocyclopropyl-5β-androstan-3-one (XI)*

To a solution of 1 g. of 7-spirocyclopropyl-5β-androstane-3,17-dione (XI) (prepared as in Example 21) in 10 ml. of boiling methanol, 2 ml. of pyrrolidine is added. The resulting solution is heated briefly under nitrogen, concentrated and allowed to cool. The crystalline solid that separates is isolated by filtration, washed with a small volume of methanol and dried to give 7-spirocyclopropyl-5β-androstane-3,17-dione 3-pyrrolidinyl enamine in the form of a crystalline solid.

A volume of 10 ml. of a 20% by weight suspension of sodium acetylide in xylene is centrifuged and the solid that separates is taken up in 60 ml. of redistilled dimethyl sulfoxide. To the resulting mixture of 5 g. of 7-spirocyclopropyl-5β-androstane-3,17-dione 3-pyrrolidinyl enamine is added. The mixture is maintained under an atmosphere of nitrogen for about 5 hours, and the excess of sodium acetylide destroyed by the dropwise addition of water. About 20 ml. of water and 50 ml. of methanol is added to obtain a clear solution which is then heated on a steam bath for about 1 hour. This material is extracted with ether and the ethereal extract washed successively with dilute hydrochloric acid, dilute sodium carbonate solution, and water, then dried over anhydrous magnesium sulfate. The dried solution is filtered and the filtrate evaporated to dryness. The residue is triturated with a mixture of ether and Skellysolve B and recrystallized twice from a mixture of acetone and Skellysolve B to give pure 17β-hydroxy-17α-ethynyl-7-spirocyclopropyl-5β-androstan-3-one (XI).

Following the procedure of Example 22 but substituting 7 - spirocyclopropyl-19-nor-5β-androstane-3,17-dione (XI) as starting material, yields 17β-hydroxy-17α-ethynyl-7-spirocyclopropyl-19-nor-5β-androstan-3-one (XI).

Following the procedure of the immediatey preceding paragraph and of Example 22 but substituting the following acetylide:

(1) sodium methylacetylide,
(2) lithium acetylide,
(3) sodium trifluoromethylacetylide, etc., yields, respectively, (1) 17β-hydroxy-17α(1-propynyl)-7-spirocyclopropyl-5β-androstan-3-one (XI),
(2) 17β-hydroxy-17α-ethynyl-7-spirocyclopropyl-5β-androstan-3-one (XI, (3) 17β-hydroxy-17α-trifluromethylethynyl-7-spirocyclopropyl-5β-androstan-3-one (XI), etc.
and the 19-nor counterparts (XI) of the foregoing.

EXAMPLE 23

*17β-hydroxy-17α-ethyl-7-spirocyclopropyl-5β-androstan-3-one (XI)*

A catalyst comprising a suspension of 0.1 g. of 1% palladium on charcoal in 30 ml. of dioxane (purified by passage through a column of neutral alumina) is reduced at atmospheric pressure with hydrogen. A solution of 0.4 g. of 17β-hydroxy-17α-ethynyl-7-spirocyclopropyl-5β-androstan-3-one (XI) (obtained as in Example 22) in 5 ml. of dioxane is injected into the reaction flask through a rubber stopper. Hydrogenation is continued until 2 moles are consumed at atmospheric pressure. The catalyst is removed by filtration and the filtrate concentrated on a rotary evaporator. The oily residue is chromatographed through a column of 65 g. of Florisil. The eluted material is crystallized from aqueous methanol. Recrystallization from the same solvent gives 17β-hydroxy-17α-spirocyclopropyl-5β-androstan-3-one (XI).

Following the procedure of Example 23 but substituting other compounds of Formula XI for the starting material employed therein, such as (1) 17β-hydroxy-17α(1-propynyl)-7-spirocyclopropyl-19-nor-5β-androstane-3-one (XI),
(2) 17β-hydroxy-17α-trifluoromethylethynyl-7-spirocyclopropyyl-5β-androstan-3-one (XI), etc.

yields, respectively, (1) 17β-hydroxy-17α-propyl-7-spirocyclopropyl-19-nor-5β-androstan-3-one (XI),
(2) 17β-hydroxy-17α(3′,3′,3′-trifluoropropyl)-7-spirocyclopropyl-5β-androstan-3-one (XI), etc.

EXAMPLE 24

*7-spirocyclopropan-5β-androstan-17α-ethenyl-17β-ol-3-one (XI)*

Following the procedure of Exampe 23 but permitting the hydrogenation described therein to proceed until only 1 mole of hydrogen is consumed instead of 2 moles, yields of 17β - hydroxy-17α-vinyl-7-spirocyclopropyl-5β-androstan-3-one (XI).

Following the procedure of Example 24 but substituting the following compounds for the starting material employed therein, such as (1) 17β-hydroxy-17α-ethynyl-7-spirocyclopropyl-19-nor-5β-androstan-3-one (XI),
(2) 17β-hydroxy-17α(1-propynyl)-7-spirocyclopropyl-5β-androstane-3-one (XI),
(3) 17β-hydroxy-17α(1-butynyl)-7-spirocyclopropyl-19-nor-5β-androstan-3-one (XI),
(4) 17β-hydroxy-17α-trifluoroethylethynyl)-7-spirocyclopropyl-5β-androstane-3-one (XI), etc.

yields, respectively, (1) 17β-hydroxy-17α-vinyl-7-spirocyclopropyl-19-nor-5β-androstan-3-one (XI),
(2) 17β-hydroxy-17α(1-propenyl)-7-spirocyclopropyl-5β-androstan-3-one (XI),
(3) 17β-hydroxy-17α(1-butenyl-7-spirocyclopropyl)-5β-androstan-3-one (XI),
(4) 17β-hydroxy-17α-trifluoromethylvinyl-7-spirocyclopropyl-5β-androstan-3-one (XI), etc.

EXAMPLE 25

*17β-hydroxy-17α-ethynyl-7-spirocyclopropyl-5β-androstan-3-one 17-acetate (XI)*

A solution of 1 g. of 17β-hydroxy-17α-ethynyl-7-spirocyclopropyl-5β-androstan-3-one (XI) (prepared as in Example 22), in 5 ml. of pyridine and 2 ml. of acetic anhydride is heated under nitrogen at 80° C. for about 16 hours. The solvent is removed on a rotary evaporator and the residue triturated with Skellysolve B, then washed with Skellysolve B and methanol, and crystallized from acetone-Skellysolve B to give 17β-hydroxy-17α-ethynyl-7-spirocyclopropyl-5β-androstan-3-one 17-acetate (XI).

In the same manner as in Example 25, the 17-butyrate, 17-hexanoate, 17-phenylacetate, 17-cinnamate and other like 17-esters of 17β-hydroxy-17α-ethynyl-7-spirocyclopropyl-5β-androstan-3-one (XI) are prepared by reaction of the 17β-alcohol (XI) with the appropriate acid anhydride or halide.

Following the procedure of the immediately preceding paragraph and of Example 25, but substituting other starting materials, such as 17β-hydroxy-17α-(1-propynyl)-7-spirocyclopropyl-19-nor-5β-androstan-3-one (XI), 17β-hydroxy-17α-ethyl-7-spirocyclopropyl-5β-androstan-3 - one (XI), 17β-hydroxy-17α-isopentyl-7-spirocyclopropyl - 19-nor-5β-androstan-3-one (XI), 17β-hydroxy - 17α - (2-butenyl)-7-spirocyclopropyl-5β-androstan - 3 - one (XI), etc., yields the corresponding 17-acylate.

EXAMPLE 26

*17β-hydroxy-7-spirocyclopropyl-5α-androstan-3-one (XIII)*

To 200 ml. of liquid ammonia, 0.15 g. of lithium wire cut in small pieces is added. After the lithium dissolved, 2 g. of 17β-hydroxy-7-spirocyclopropyl-4-androsten-3 - one (X) (obtained as in Example 20) in 40 ml. of tetrahydrofuran (purified by passage through a column of aluminum oxide) is slowly added to the solution of lithium in ammonia at reflux. The resulting solution is allowed to stand for about 15 minutes, then 3 g. of solid ammonium chloride is added and the ammonia is rapidly evaporated on a steam bath. Water is added and the product extracted with ether. The ether extract is washed successively with water, dilute hydrochloric acid, water and brine, then dried over magnesium sulfate, filtered and concentrated to dryness. The amorphous solid is dissolved in methylene chloride and the solution poured onto a column of Florisil. Following chromatography and crystallization from ethyl acetate, the product (XIII) is obtained. Recrystallization from acetone gives pure 17β-hydroxy-7-spirocyclopropyl-5α-androstan-3-one (XIII).

Following the procedure of Example 26 but substituting other compounds of Formula X, such as (1) 17β-hydroxy-7-spirocyclopropyl-19-nor-4-androsten 3-one (X),
(2) 17β-hydroxy-17α-methyl-7-spirocyclopropyl-4-androsten-3-one (X), etc., yields, respectively, (1) 17β-hydroxy-7-spirocyclopropyl-19-nor-5α-androstan-3-one (XIII),
(2) 17β-hydroxy-17α-methyl-7-spirocyclopropyl-5α-androstan-3-one (XIII), etc.

EXAMPLE 27

*7-spirocyclopropyl-5α-androstane-3,17-dione (XIII)*

To a solution of 0.3 g. of 17β-hydroxy-7-spirocyclopropyl-5α-androstan-3-one (XIII) (obtained as in Example 26) in 10 ml. of acetone, 0.25 ml. of 8 N chromium trioxide reagent (J. Org. Chem. 21 1547) is added with cooling. The crude product (XII) is precipitated with water, filtered, dried and recrystallized from acetone-Skellysolve B to give 7-spirocyclopropyl-5α-androstane-3,17-dione (XIII).

Following the procedure of Example 27 but substituting 17β-hydroxy-7-spirocyclopropyl-19-nor-5α-androstan - 3-one (XIII), yields 7-spirocyclopropyl-19-nor-5α-androstane-3,17-dione (XIII).

EXAMPLE 28

*17β-hydroxy-17α-ethynyl-7-spirocyclopropyl-5α-androstan-3-one 17-acetate (XIII)*

Following the procedure of Example 22 but substituting 7-spirocyclopropyl-5α-androstane-3,17-dione (XIII) (prepared as in Example 27) as starting material, yields 17β-hydroxy-17α-ethynyl-7-spirocyclopropyl-5α-androstan - 3-one (XIII). Dissolving the product in a sufficient volume of pyridine, adding about an equal volume of acetic anhydride, and heating the mixture at about 80° C. for about 16 hours, gives the corresponding 17-acetate (XIII).

Following the procedures of Example 28 and the two paragraphs following Example 22 yields representative 17α-alkynyl compounds of Formula XII, such as 17β-hydroxy-17α-ethynyl-7-spirocyclopropyl-19-nor-5α - androstan-3-one (XIII), 17β-hydroxy-17α-(2-butynyl)-7-spirocyclopropyl-5α-androstan-3-one (XIII), 17β-hydroxy-17α-trifluomethylethynyl-7-spirocyclopropyl - 19 - nor - 5α-androstan-3-one (XIII), etc., and the corresponding 17-acetates (XIII).

EXAMPLE 29

*17β-hydroxy-17α-ethyl-7-spirocyclopropyl-5α-androstan-3-one (XIII)*

Following the procedure of Example 23 but substituting 17β-hydroxy-17α-ethynyl-7-spirocyclopropyl-5α - androstan-3-one (XII) (prepared as in Example 28) as starting material, yields 17β-hydroxy-17α-ethyl-7-spirocyclopropyl-5α-androstan-3-one (XIII).

Following the procedures of Example 29 and the two paragraphs following Example 23 yields representative 17α-alkyl compounds of Formula XII, such as 17β-hydroxy-17α-butyl-7-spirocyclopropyl-19-nor-5α - androstan-3-one (XIII), 17β-hydroxy-17α-(3',3',3'-trifluoropropyl)-7-spirocyclopropyl-5α-androstan-3-one (XIII), etc.

EXAMPLE 30

*17β-hydroxy-17α-vinyl-7-spirocyclopropyl-5α-androstan-3-one (XIII)*

Following the procedure of Example 24 but substituting 17β-hydroxy-17α-ethynyl-7-spirocyclopropyl - 5α - androstan-3-one (XIII) as starting material, yields 17β-hydroxy-17α-vinyl-7-spirocyclopropyl-5α-androstan - 3 - one (XIII).

Following the procedures of Example 30 and the paragraph following Example 24 yields representative 17α-alkenyl compounds of Formula XIII, such as 17β-hydroxy-17α-(1-propenyl)-7-spirocyclopropyl-19 - nor - 5α-androstan-3-one (XIII), 17β-hydroxy-17α-(3',3',3' - trifluoropropenyl)-7-spirocyclopropyl-5α-androstan - 3 - one (XIII), etc.

EXAMPLE 31

*7-spirocyclopropyl-5α-androstane-3β,17β-diol (XII)*

To a solution of 2.5 g. of 17β-hydroxy-7-spirocyclopropyl-5α-androstan-3-one (XIII) (obtained as in Example 26) in 25 ml. of 95% alcohol, 0.6 g. of sodium borohydride is added. After stirring for about 1.25 hours, acetic acid is added to the reaction mixture until the excess sodium borohydride is destroyed. The crude product (XIII) is precipitated with water, filtered, washed, dried and recrystallized from acetone-Skellysolve B to yield pure 7-spirocyclopropyl-5α-androstane-3β,17β-diol (XII)

Following the procedure of Example 31 but substituting other compounds of Formula XIII as starting material, such as (1) 17β-hydroxy-7-spirocyclopropyl-19-nor-5α-androstan-3-one 17-propionate (XIII),
(2) 17β-hydroxy-17α-propyl-7-spirocyclopropyl-5α-androstan-3-one (XIII), etc., yields, respectively, (1) 7-spirocyclopropyl-19-nor-5α-androstane-3β,17β-diol-17-propionate (XII),
(2) 17α-propyl-7-spirocyclopropan-5α-androstane-3β,17β-diol (XII), etc.

EXAMPLE 32

*3α-hydroxy-7-spirocyclopropan-5α-androstan-17-one (XII) and the corresponding 3b-ol (XII)*

A solution of 300 mg. of 7,1'-spirocyclopropan-5α-androstane-3,17-dione (XIII) (obtained as in Example 27) in 5 ml. of pyridine is added to a solution of 15 mg. of sodium borohydride in 20 ml. of pyridine. The solution is allowed to stand at room temperature for about 2 hours, then diluted with water and extracted with ether. The ether extracts are washed with water, dried and evaporated to dryness under vacuum to give a residue containing 3α - hydroxy-7-spirocyclopropyl-5α-androstan-17-one (XII) and its corresponding 3β-ol (XI). Separation into the 3α- and 3β-epimers is effected by standard procedures known in the steroid art, e.g., by adsorption of the mixture of epimers onto Florisil in methylene chloride and gradient elution with acetone-Skellysolve to give the 3β-product; further purification of the adjacent chromatograph fraction by chromatography on charcoal or silica gel affords the 3α-hydroxy isomer.

EXAMPLE 33

*17α-ethynyl-7-spirocyclopropyl-5α-androstane-3β,17β-diol 17-acetate (XII)*

A solution of 0.5 g. of 17α-ethynyl-7-spirocyclopropyl-5α-androstan-3-one 17-acetate (XIII) (prepared as in Example 28) in 5 ml. of tetrahydrofuran (purified by passage through a column of neutral alumina) is cooled in an ice bath and a cooled solution of 1 g. of lithium tri-t-butoxy aluminum hydride in 5 ml. of tetrahydrofuran added. After standing at room temperature for about 18 hours, a mixture of 5% acetic acid and 95% water is added and the product extracted with ether. The extract is washed with water and dried over magnesium sulfate. The solvent is evaporated and the crude product chromatographed through Florisil. The fractions of the desired 3b-hydroxy compound are combined and recrystallized twice from a mixture of water and acetone, to yield 17α-ethynyl-7-spirocyclopropyl-5α-androstane - 3β,17β - diol 17-acetate (XII).

Following the procedure of Example 33 but employing other starting 3-keto-17α-alkynyl-5α-androstanes of Formula XIII (prepared in the same manner as the corresponding 3-keto-17α-alkynyl - 5β - androstanes of Formula XI described in the two paragraphs following Example 22), yields the corresponding 17α-alkynyl-7-spirocyclopropyl-5α-androstane-3β,17β-diols (XII).

EXAMPLE 34

*17α-ethyl-7-spirocyclopropyl-5α-androstane-3β,17β-diol (XII)*

Following the procedure of Example 23 but substituting 17α-ethynyl-7-spirocyclopropyl - 5α - androstane-3β,17β-diol 17-acetate (XII) (prepared as in Example 33) as starting material, yields 17α-ethyl-7-spirocyclopropyl-5α-androstane-3β,17β-diol (XII).

Following the procedure of Example 34 but substituting 17α(1-propynyl) - 7 - spirocyclopropyl-19-nor-5α-androstane-3α,17β-diol (XIII) as starting material, yields 17α(3-propyl)-7-spirocyclopropyl - 19 - nor - 5α - androstane-3α,17β-diol (XII).

EXAMPLE 35

*17α-vinyl-7-spirocyclopropyl-5α-androstan-3β,17β-diol (XII)*

Following the procedure of Example 24 but substituting 17α-ethynyl-7-spirocyclopropyl - 5α - androstane-3β,17β-diol (XII) as starting material, yields 17α-vinyl-7-spirocyclopropyl-5α-androstan-3β,17β-diol (XII).

Following the procedure of Example 35 but substituting 17α(2-butynyl)-7-spirocyclopropyl - 19 - nor - 5α-androstane-3β,17β-diol (XII) as starting material, yields 17α(2-butenyl)-7-spirocyclopropyl - 19 - nor - 5α-androstane-3β,17β-diol (XII).

EXAMPLE 36

*17β-hydroxy-7-spirocyclopropyl-19-nor-5α-androstan-3-one 17-propionate (XIII)*

To a solution of 0.3 g. of 7-spirocyclopropyl-19-nor-5α-androstane-3β,17β-diol 17-propionate (XII) (obtained as in the paragraph following Example 31) in 10 ml. of acetone, 0.25 ml. of 8 N chromium trioxide reagent is added with cooling. The crude product (XII) is precipitated with water, filtered, dried and recrystallized from acetone-Skellysolve B to give 17β-hydroxy-7-spirocyclopropyl-19-nor-5α-androstan-3-one 17-propionate (XIII).

Following the procedure of Example 36 but substituting other compounds of Formula XII as starting materials, such as (1) 3β-hydroxy-7-spirocyclopropyl-5α-androstan-17-one (XII),
(2) 17α-ethyl-7-spirocyclopropyl-19-nor-5α-androstane-3β,17β-diol 17-valerate (XII),
(3) 17α(1-butynyl)-7-spirocyclopropyl-5α-androstane-3β,17β-diol 17-trimethylacetate (XII),
(4) 17α(3-pentenyl)-7-spirocyclopropyl-19-nor-5α-androstane-3β,17β-diol 17-hexanoate (XII), etc., yields, respectively, (1) 7-spirocyclopropyl-5α-androstane-3,17-dione (XIII),
(2) 17β-hydroxy-17α-ethyl-7-spirocyclopropyl-19-nor-5α-androstan-3-one 17-valerate (XIII),
(3) 17β-hydroxy-17α(1-butynyl)-7-spirocyclopropyl-5α-androstan-3-one 17-trimethylacetate (XIII),
(4) 17β-hydroxy-17α(3-pentenyl)-7-spirocyclopropyl-19-nor-5α-androstan-3-one 17-hexanoate (XIII), etc.

EXAMPLE 37

*3β-hydroxy - 7 - spirocyclopropyl - 5β - androstan-17-one (XIV) and 3α-hydroxy-7-spirocyclopropyl-5β-androstan 17-one (XIV)*

A solution of 1 g. of 7-spirocyclopropan-5β-androstane-3,17-dione (XI) (obtained as in the paragraph following Example 21) in 25 ml. of isopropanol is added to a solution of 45 mg. of sodium borohydride in 1 ml. of water and 5 ml. of isopropanol. After about 20 minutes, water and ether are added, the organic phase is washed with water, dried and evaporated to a residue. The residue is separated into two components by chromatography on a column of alumina and by recrystallization to yield 3β-hydroxy-7-spirocyclopropyl-5β-androstan-17-one (XIV) and 3α-hydroxy-7-spirocyclopropyl-5β-androstan-17-one (XIV).

Following the procedure of Example 37 but substituting 7-spirocyclopropyl-19-nor - 5β - androstane - 3,17-dione (XI) as starting material, yields 3β-hydroxy-7-spirocyclopropyl-19-nor-5β-androstan-17-one (XIV) and 3α-hydoxy-7-spirocyclopropyl-19-nor-5β-androstan-17-one (XIV).

EXAMPLE 38

*7-spirocyclopropyl-19-nor - 5β - androstane - 3β,17β - diol 17 - acetate (XIV) and 7-spirocyclopropyl-19-nor-5β-androstane-3α,17β-diol 17-acetate (XIV)*

To a solution of 1 g. of 17β-hydroxy-7-spirocyclopropyl-19-nor-5β-androstan-3-one 17-acetate (XI) (obtained as in the paragraph following Example 21) in 25 ml. of methanol, 125 mg. of sodium borohydride in 2 ml. of water is added. The mixture warms spontaneously and after standing at room temperature for about 20 minutes, excess sodium borohydride is destroyed by the addition of a few drops of acetic acid. The reaction mixture is diluted to about 50 ml. with water, extracted with ether, the ether extracts washed with water, dried over magnesium sulfate and evaporated to dryness under reduced pressure. The crude solid is crystallized from acetone-Skellysolve B; recrystallization from the same solvent pair yields pure 7-spirocyclopropyl-19-nor-5β-androstane-3α,17β-diol 17-acetate (XIV). Chromatography of the mother liquor over a column of Florisil yields 7-spirocyclopropyl-19-nor-5β-androstane-3β,17β-diol 17 - acetate (XIV).

Following the procedure of Example 38 but substituting 17β-hydroxy - 7 - spirocyclopropyl-5β-androstan-3-one 17-acetate (XI) and 17β-hydroxy - 17α - propyl-7-spirocyclopropyl-5β-androstan-3-one (XI) as starting materials, yields 7 - spirocyclopropyl-5β-androstane-3α,17β-diol 17-acetate (XIV), 7-spirocyclopropyl - 5β - androstane - 3β,17β-diol 17-acetate (XIV), 17α-propyl-7-spirocyclopropyl-3α,17β-diol (XIV) and 17α-propyl-7-spirocyclopropyl-5β-androstane-3β,17β-diol (XIV).

EXAMPLE 39

*17α - ethynyl - 7 - spirocyclopropyl-5β-androstane-3α17β-diol 17-acetate (XIV) and the corresponding 2β-ol (XIV)*

A solution of 1 g. of 17β-hydroxy-17α-ethynyl-7-spirocyclopropyl-5β-androstan-3-one 17-acetate (XI) (prepared as in Example 25) in 25 ml. of methanol is added to a solution of 0.125 g. of sodium borohydride in 2 ml. of water and 10 ml. of methanol. After standing at room temperature for about 20 minutes, the solution is diluted with water and extracted with ether. The ether extract is evaporated to dryness and recrystallized from acetone-Skellysolve B to yield pure 17α-ethynyl-7-spirocyclopropyl-5β-androstane-3α,17β-diol 17-acetate (XIV). Chromatography of the mother liquors from which the 3α-product is collected, after crystallization from ethyl acetate, gives pure 17α-ethynyl-7-spirocyclopropyl-5b-androstane-3β,17β-diol 17-acetate (XIV).

Following the procedure of Example 39 but substituting other compounds of Formula XI as starting materials, such as (1) 17β - hydroxy - 17α - ethynyl-7-spirocyclopropyl-19-nor-5β-androstan-3-one (XI),
(2) 17β-hydroxy - 17α - trifluoromethylethynyl-7-spirocyclopropyl-1β-androstan-3-one (XI), etc., yields, respectively, (1) 17α - ethynyl - 7 - spirocyclopropyl-19-nor-5β-androstane-3α,17β-diol (XIV) and its 3β-epimer (XIV),
(2) 17β - trifluoromethylethynyl - 7 - spirocyclopropyl-5β - androstane-3α,17β-diol (XIV) and its 3β-epimer (XIV), etc.

EXAMPLE 40

*17α-ethyl - 7 - spirocyclopropyl - 19 - nor-5β-androstane-2β,17β-diol (XIV)*

Following the procedure of Example 23 but substituting 17α - ethynyl - 7 - spirocyclopropyl-19-nor-5β-androstane-3β,17β-diol (XIV) (obtained as in the paragraph following Example 39) as starting material, yields 17β-ethyl-7-spirocyclopropyl - 19 - nor - 5β - androstane-3β,17β-diol (XIV).

Following the procedure of Example 40 but substituting other compounds of Formula XIV for the starting material employed therein, such as (1) 17α(1 - butynyl) - 7 - spirocyclopropyl-5β-androstane-3α,17β-diol (XIV),
(2) 17α - trifluoromethylethynyl - 7 - spirocyclopropyl-19-nor-5β-androstane-3β,17β-diol 17-valerate (XIV), etc., yields, respectively, (1) 17α - butyl - 7 - spirocyclopropyl - 5β - androstane-3α,17β-diol (XIV),
(2) 17α(3',3',3' - trifluoropropyl) - 7 - spirocyclopropyl-19 - nor-5β-androstane-3β,17β-diol 17-valerate (XIV), etc.

EXAMPLE 41

*17α-vinyl-7-spirocyclopropyl-5β-androstane-3α,17β-diol (XIV)*

Following the procedure of Example 24 but substituting 17α - ethynyl - 7 - spirocyclopropyl-5β-androstane- 3α,17β-diol (XIV) (obtained as in the paragraph following Example 39) as starting material, yields 17α-vinyl-7-spirocyclopropyl - 5β - androstane - 3α,17β-diol (XIV).

Following the procedure of Example 41 but substituting other compounds of Formula XIV as starting material, such as (1) 17α(1 - propynyl) - 7 - spirocyclopropyl-19-nor-5β-androstane-3β,17β-diol (XIV),
(2) 17α - trifluoromethylethynyl - 7 - spirocyclopropyl-5β - androstane - 3α,17β-diol 17-butyrate (XIV), etc., yields, respectively, (1) 17α(1 - propynyl) - 7 - spirocyclopropyl-19-nor-5β-androstane-3β,17β-diol (XIV),
(2) 17α - trifluoromethylethynyl - 7 - spirocyclopropyl-5β - androstane - 3α,17β-diol 17-butyrate (XIV), etc.

EXAMPLE 42

*7-spirocyclopropyl-5β-androstane-3β,17β-diol (XIV)*

To 0.6 g. of 7-spirocyclopropyl-5β-androstane-3β,17β-diol - 17 - acetate (XIV) (prepared as in the paragraph following Example 38) dissolved in 50 ml. of 95% ethanol, 0.1 g. of potassium hydroxide is added. The mixture is swirled until the base dissolves and is heated at reflux for about 8 hours. The mixture is then made barely acidic with dilute acetic acid and the major portion of the ethanol removed by vacuum distillation. The product crystallizes and is collected by filtration, washed with water and dried under vacuum to give crystalline 7-spirocyclopropyl-5β-androstane-3β,17β-diol (XIV).

Following the procedure of Example 42 but substituting other starting materials, such as (1) 17β - hydroxy - 17α-ethynyl-7-spirocyclopropyl-19-nor-5β-androstan-3-one-17-propionate (XI),
(2) 17β-hydroxy-17α-butyl-7-spirocyclopropyl - 4 - androsten-3-one 7-trimethylacetate (X),
(3) 7 - spirocyclopropyl - 9 - nor-5-androstene - 3β,17β-diol 17-butyrate (IX),
(4) 17α-(1-butynyl) - 7 - spirocyclopropyl-5-androstene-3β,17β-diol 17-propionate (IX),
(5) 17β - hydroxy - 17α - ethyl-7-spirocyclopropyl-19-nor-5α-androstan-3-one 17-valerate (XIII),
(6) 17β - hydroxy - 7 - spirocyclopropyl-5α-androstan-3-one 17-propionate (XIII),
(7) 7-spirocyclopropyl - 19 - nor-5α-androstane-3α,17β-diol 17-phenylacetate (XII),
(8) 7 - spirocyclopropyl - 5α - androstane-17α(1-propynyl)-3β,17β-diol 17-hexanoate (XII),
(9) 7 - spirocyclopropyl - 3α,5α - cycloandrostane - 6α,17β - diol 6,17 - diacetate (VIII),
(10) 17α(1 - butynyl) - 7 - spirocyclopropyl - 19 - nor-3α,5α - cycloandrostane-6α,17β-diol 17-cyclopentylpropionate (VIII), etc., yields, respectively, (1) 17β - hydroxy - 17α - ethynyl - 7 - spirocyclopropyl-19-nor-5β-androstan-3-one (XI),
(2) 17β - hydroxy - 17α - butyl - 7 - spirocyclopropyl - 4-androsten-3-one (X),
(3) 7 - spirocyclopropyl - 19 - nor - 5 - androstene - 3β,17β-diol (IX),
(4) 17α(1 - butynyl) - 7 - spirocyclopropyl - 5 - androstene-3β,17β-diol (IX),
(5) 17β - hydroxy - 17α - ethyl - 7 - spirocyclopropyl-19-nor-5α-androstan-3-one (XIII),
(6) 17β-hydroxy - 7 - spirocyclopropyl - 5α - androstan-3-one (XIII),
(7) 7 - spirocyclopropyl - 19 - nor - 5α - androstane - 3α,17β-diol (XII),
(8) 17α(1 - propynyl) - 7 - spirocyclopropyl - 5α - androstane-3β,17β-diol (XII),
(9) 7 - spirocyclopropyl - 3α,5α - cycloandrostane - 6α,17β-diol (VIII),
(10) 7 - spirocyclopropyl - 19 - nor - 3α,5α - cycloandrostane - 17α(2-butynyl) - 6α,17β-diol (VIII), etc.

EXAMPLE 43

*17β-hydroxy-7-spirocyclopropyl-4-androsten-3-one 17-acetate (X)*

A solution of 1 g. of 17β-hydroxy-7-spirocyclopropyl-4-androsten-3-one (X) (obtained as in Example 20) dissolved in 6 ml. of dried and redistilled pyridine, is mixed with 6 ml. of acetic anhydride. After heating at 80° C. for about 16 hours, the reaction mixture is poured into ice water. After about 2 hours the mixture is filtered, the precipitate washed with water and dried under vacuum. Recrystallization from a mixture of acetone and hexane gives pure 17β - hydroxy - 7 - spirocyclopropyl - 4 - androsten-3-one 17-acetate (X).

Following the procedure of Example 43 but employing other 17β-ols and appropriate acid anhydrides of carboxylic acids, such as (1) 17β - hydroxy - 7 - spirocyclopropyl - 19 - nor - 4-androsten-3-one (X) and cyclopentylpropionic anhydride,
(2) 17β - hydroxy - 17α - methyl - 7 - spirocyclopropyl-4-androstene-3-one (X) and trimethylacetic anhydride,
(3) 17β - hydroxy - 17α(1-propynyl) - 7 - spirocyclopropyl - 19 - nor - 4 - androsten - 3 - one (X) and valeric anhydride,
(4) 17β - hydroxy - 7 - spirocyclopropyl - 5β - androstan-3-one (XI) and butyric anhydride,
(5) 17β - hydroxy - 17α - ethynyl - 7 - spirocyclopropyl-19-nor-5β-androstan-3-one (XI) and hexanoic anhydride,
(6) 17β - hydroxy - 17α - butyl - 7 - spirocyclopropyl-5β-androstan-3-one (XI) and phenylacetic anhydride,
(7) 17β - hydroxy - 17α(1-butenyl) - 7 - spirocyclopropyl-19-nor-5β-androstan-3-one (XI) and cyclohexylpropionic anhydride,
(8) 17β - hydroxy - 7 - spirocyclopropyl - 5α - androstan-3-one (XIII) and propiolic anhydride,
(9) 17β - hydroxy - 17α - ethynyl - 7 - spirocyclopropyl-19-nor-5α-androstan-3-one (XIII) and acetic anhydride,
(10) 17β - hydroxy - 17α(3-butenyl) - 7 - spirocyclopropyl-5α-androstan-3-one (XIII) and cinnamic anhydride, etc., yields respectively, (1) 17β - hydroxy - 7 - spirocyclopropyl - 19 - nor - 4-androsten-3-one 17-cyclopentylpropionate (X),
(2) 17β - hydroxy - 17α - methyl - 7 - spirocyclopropyl-4-androsten-3-one 17-trimethylacetate (X),
(3) 17β - hydroxy - 17α(1-propenyl) - 7 - spirocyclopropyl-19-nor-4-androsten-3-one 17-valerate (X),
(4) 17β - hydroxy - 7 - spirocyclopropyl - 5β - androstan-3-one 17-butyrate (XI),
(5) 17β - hydroxy - 17α - ethynyl - 7 - spirocyclopropyl-19-nor-5β-androstan-3-one 17-hexanoate (XI),
(6) 17β - hydroxy - 17α - butyl - 7 - spirocyclopropyl-5β-androstan-3-one 17-phenylacetate (XI),
(7) 17β - hydroxy - 17α(2-butenyl) - 7 - spirocyclopropyl-19-nor-5β-androstan-3-one 17-cyclohexylpropionate (XI),
(8) 17β - hydroxy - 7 - spirocyclopropyl - 5α - androstan-3-one 17-propiolate (XIII),
(9) 17β - hydroxy - 17α - ethynyl - 7 - spirocyclopropyl-19-nor-5α-androstan-3-one 17-acetate (XIII),
(10) 17β - hydroxy - 17α(3-butenyl) - 7 - spirocyclopropyl-5α-androstan-3-one 17-cinnamate (XIII), etc.

We claim:
1. A compound of the formula

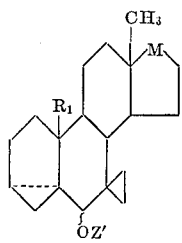

wherein ∫ is a generic expression denoting α- and β-bonds and mixtures thereof; $R_1$ is selected from the group consisting of hydrogen and methyl; Z' is selected from the group consisting of hydrogen, alkyl of from one through twelve carbon atoms, and the acyl radical of a hydrocarbon carboxylic acid containing from one through twelve carbon atoms; M is selected from the group consisting of

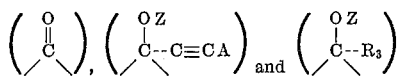

wherein A is selected from the group consisting of hydrogen, alkyl of from one through four carbon atoms, chlorine, bromine and trifluoromethyl, $R_3$ is selected from the group consisting of hydrogen, alkyl of from one through twelve carbon atoms and alkenyl of from two through twelve carbon atoms, and Z is selected from the group consisting of hydrogen and the acyl radical of a hydrocarbon carboxylic acid containing from one through twelve carbon atoms.

2. A compound of claim 1 wherein the bond at the 6-position has the α-stereoconfiguration, $R_1$ is methyl, Z' is hydrogen and M is

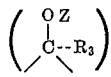

wherein Z and $R_3$ are hydrogen, namely, 7-spirocyclopropyl - 3α,5α - cycloandrostane - 6α,17β - diol having the formlua

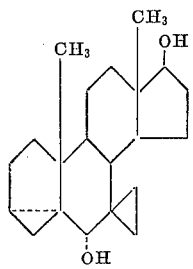

3. A compound of the formula

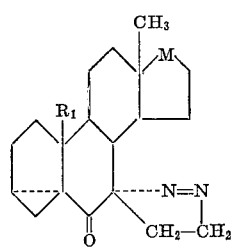

wherein $R_1$ is selected from the group consisting of hydrogen and methyl and M is selected from the group consisting of

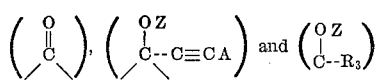

wherein A is selected from the group consisting of hydrogen, alkyl of from one through four carbon atoms, chlorine, bromine and trifluoromethyl, $R_3$ is selected from the group consisting of hydrogen, alkyl of from one through twelve carbon atoms and alkenyl of from two through twelve carbon atoms, and Z is selected from the group consisting of hydrogen and the acyl radical of a hydrocarbon carboxylic acid containing from one through twelve carbon atoms.

4. A compound of claim 3 wherein $R_1$ is methyl and M is

namely, spiro[6,17 - dioxo-3α,5α-cycloandrostane-7,3'[1]-pyrazoline] having the formula

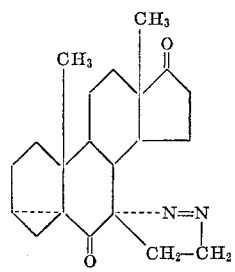

5. 7 - spirocyclopropyl - 3α,5α - cycloandrostane-6,17-dione having the formula

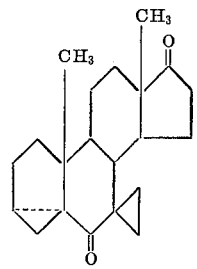

6. 7 - ethylidene - 3α,5α - cycloandrostane - 6,17 - dione having the formula

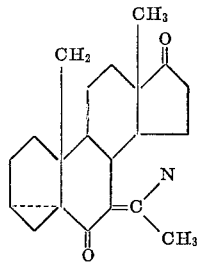

7. 3α,5α - cyclospiro[androstane - 7,2' - hydroxyethyl]-6,17-dione having the formula

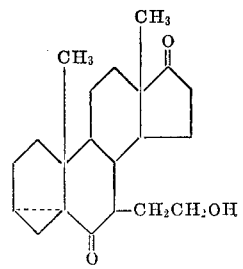

8. A compound of the formula

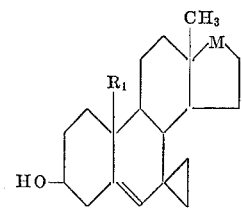

wherein $R_1$ is selected from the group consisting of hydrogen and methyl; M is selected from the group consisting of

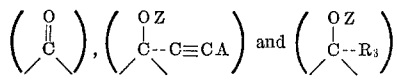

wherein A is selected from the group consisting of hydrogen, alkyl of from one through four carbon atoms, chlorine, bromine and trifluoromethyl, $R_3$ is selected from the group consisting of hydrogen, alkyl of from one through twelve carbon atoms and alkenyl of from two through twelve carbon atoms, and Z is selected from the group consisting of hydrogen and the acyl radical of a hydrocarbon carboxylic acid containing from one through twelve carbon atoms.

9. A compound of claim 8 wherein $R_1$ is methyl and M is

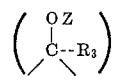

wherein $R_3$ and Z are hydrogen, namely 7-spirocyclopropyl-5-androstene-3β,17β-diol.

10. A compound of claim 8 wherein $R_1$ is methyl and M is

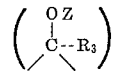

wherein $R_3$ is hydrogen and Z is acetyl, namely 7-spirocyclopropyl-5-androstene-3β,17β-diol 17-acetate.

11. A compound of the formula

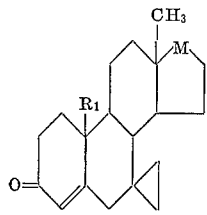

wherein $R_1$ is selected from the group consisting of hydrogen and methyl; M is selected from the group consisting of

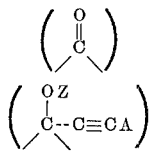

and

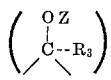

wherein A is selected from the group consisting of hydrogen, alkyl of from one through four carbon atoms, chlorine, bromine and trifluoromethyl, $R_3$ is selected from the group consisting of hydrogen, alkyl of from one through twelve carbon atoms and alkenyl of from two through twelve carbon atoms, and Z is selected from the group consisting of hydrogen and the acyl radical of a hydrocarbon carboxylic acid containing from one through twelve carbon atoms.

12. A compound of claim 11 wherein $R_1$ is methyl and M is

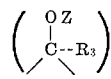

wherein $R_3$ and Z are hydrogen, namely, 17β-hydroxy-7-spirocyclopropyl-4-androsten-3-one.

13. A compound of claim 11 wherein $R_1$ is methyl and M is

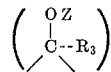

wherein $R_3$ is hydrogen and Z is acetyl, namely, 17β-hydroxy-7-spirocyclopropyl-4-androsten-3-one 17-acetate.

References Cited

UNITED STATES PATENTS 3,063,987  11/1962  Pappo _____ 260—239.5

OTHER REFERENCES

Djerassi: Steroid Reactions, pp. 94–138 (1938).
Georgian et al.: Chem. and Industry, pp. 1755–56 (1962).

HENRY A. FRENCH, Primary Examiner

U.S. Cl. X.R.

260—239.55, 397.3, 397.4, 397.5, 999